United States Patent [19]

Nakajima et al.

[11] Patent Number: 5,523,859

[45] Date of Patent: Jun. 4, 1996

[54] IMAGE FORMING APPARATUS WITH ERASABLE MEMORY

[75] Inventors: Akio Nakajima, Toyokawa; Yoshikazu Ikenoue, Toyohashi, Japan

[73] Assignee: Minolta Camera Kabushiki Kaisha, Osaka, Japan

[21] Appl. No.: 300,331

[22] Filed: Sep. 2, 1994

Related U.S. Application Data

[63] Continuation of Ser. No. 97,886, Jul. 27, 1993.

[30]   Foreign Application Priority Data

Jul. 28, 1992 [JP]  Japan .................................. 4-200821

[51] Int. Cl.⁶ .............................. H04N 1/40; H04N 1/32
[52] U.S. Cl. ...................... 358/444; 358/404; 358/468; 355/115
[58] Field of Search ..................... 358/444, 404, 358/468, 406, 440, 441; 355/204, 201, 203, 202, 115, 126

[56]   References Cited

U.S. PATENT DOCUMENTS

| | | | |
|---|---|---|---|
| 4,140,272 | 2/1979 | Atalla | 235/380 |
| 4,315,684 | 2/1982 | Sugiura et al. | 355/14 R |
| 4,597,018 | 6/1986 | Sonobe et al. | 358/296 |
| 4,720,730 | 1/1988 | Ito | 355/4 |
| 4,900,902 | 2/1990 | Sakakibara | 358/400 |
| 5,182,650 | 1/1993 | Inoue et al. | 358/296 |
| 5,182,796 | 1/1993 | Shibayama | 395/156 |

FOREIGN PATENT DOCUMENTS 60-190069   9/1985   Japan .

Primary Examiner—Edward L. Coles, Sr.
Assistant Examiner—Madeleine Av Nguyen
Attorney, Agent, or Firm—Willian Brinks Hofer Gilson & Lione

[57]   ABSTRACT

An image forming apparatus includes a scanning unit for reading image information, an image forming device for forming images corresponding to the image information, a memory for storing the image information read by the scanning unit, an identification device for identifying the users of the image forming apparatus, a setting device for setting the time period for maintaining the image information stored in the memory in accordance with the user of the image forming apparatus, and an erasing device for erasing the image information stored in the memory after the elapse of the time period set for each user by the setting device.

3 Claims, 32 Drawing Sheets

IT

| ID code | memor erase timing |
|---------|--------------------|
| 1 2 3 4 | 0 min. |
| 3 4 5 6 | 10 min. |
| 4 5 6 7 | 60 min. |
| 5 6 7 8 | 10 min. |

MT 1

| area | page | prior link | after link | additional info. |
|------|------|------------|------------|------------------|
| 0 0  | 1    | 0 0        | 0 1        |                  |
| 0 1  | 1    | 0 1        | F F        |                  |
| 0 2  | 2    | 0 0        | 0 3        |                  |
| 0 3  | 2    | 0 3        | F F        |                  |
| ⋮    | ⋮    | ⋮          | ⋮          | ⋮                |

306

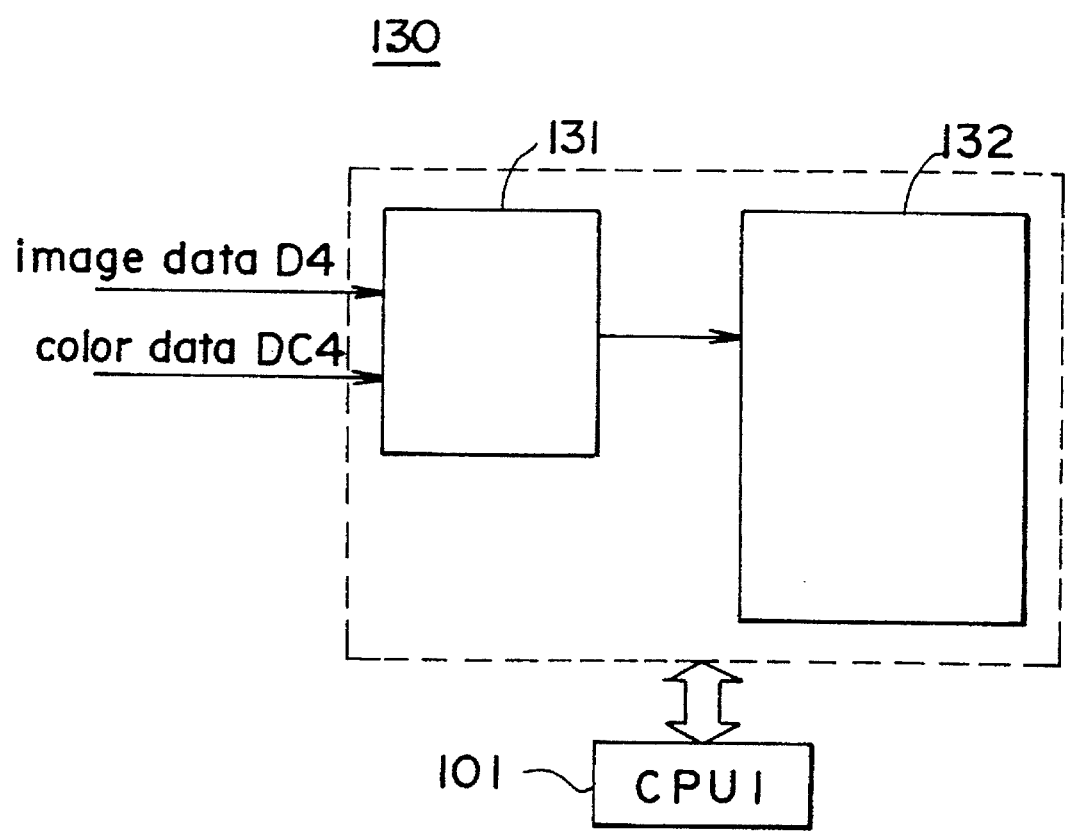

IMAGE FORMING APPARATUS WITH ERASABLE MEMORY

This application is a continuation of application Ser. No. 08/097,886, filed Jul. 27, 1993.

BACKGROUND OF THE INVENTION

1. Field of the Invention

The present invention relates to an image forming apparatus provided with a memory for storing image information corresponding to an original document image.

2. Description of the Related Art

Conventional copying apparatus of the digital type are capable of realizing so-called memory mode copying. Copying apparatus are known which are capable of making multiple copies, for example, wherein the original document is first read only one time and the read image data are stored in memory, such that said image data are repeatedly read from said memory until a specified number of copies has been completed.

In memory mode copying, the number of times the original document image is read is fewer than in normal copying wherein the original document is read for each single copy, thereby rapidly increasing the copy speed. Furthermore, in memory mode copying, the image orientation can be rotated 90 degrees via the memory access control, such that the orientation of the copy image can be unified relative to the copy sheet.

Copying apparatus which store the image information of original documents in the previously described manner have limited memory capacity. Therefore, such apparatus must have a method for erasing the image data stored within said memory (memory erasure) at all times.

Conventional copying apparatus are constructed so as to automatically accomplish memory erasure when the copying process has been completed, or after a predetermined time period has elapsed thereafter (the length of said time period being constant). A conventional copying apparatus of this type is disclosed in Japanese Patent Application No. 60-190069.

Heretofore, the mode of use of a copying apparatus in a typical office, for example, was limited insofar as the ease of use of said copying apparatus had to be appropriate for all users in the office, although said users actually had different needs regarding the number of copies, mode of operation and the like. Thus, memory erasure was accomplished at uniform points in time.

However, from the standpoint of information security, users handling confidential documents desire to implement memory erasure after completing their copying operation. Furthermore, when a user needs to execute a copying operation wherein the number of sheets of the original document exceeds the memory storage capacity of the apparatus, said original document must be divided such that each subset of the original document contains a plurality of sheets. In such a case, the processing (setting the originals in the tray and the like) must be repeated for each subset of sheets in a continuous operation, and it is desirable that memory erasure be accomplished when copying is completed so as to improve efficiency.

In contrast to the aforesaid circumstance, users who frequently use the multiple copy operation when preparing large volume materials having a plurality of portions which exceed the number of available sorter bins will find memory erasure when the copying operation is completed (in this instance, at the completion of each multiple copy cycle) unsuitable from the perspective of the content is of said operation wherein the multiple copy operation for a number of document portions less than the number of available bins must be repeated a number of times. In such circumstances, it is desirable that the copying apparatus be capable of continuously storing the image information only for a time period specified by the user after the completion of the copying operation.

An operation key is provided for specifying memory erasure. Although copying apparatus constructed so as to accomplish memory erasure when said operation key is depressed have been considered, such operation is troublesome inasmuch as memory erasure must be specified each time a user uses said copying apparatus. Furthermore, information security is breached if a user forgets to specify memory erasure.

SUMMARY OF THE INVENTION

A main object of the present invention is to provide an image forming apparatus which is easy to use and capable of practical application of a function for forming images based on image information stored in memory in accordance with the individual circumstances of a plurality of users.

The objects of the present invention are accomplished by providing an image forming apparatus comprising:

image reading means for reading image information;

image forming means for forming images corresponding to said image information;

memory means for storing the image information read by said image reading means;

identification means for identifying the users of said image forming apparatus;

setting means for setting the time period for maintaining the image information stored in said memory means in accordance with the user of said image forming apparatus; and erasing means for erasing the image information stored in said memory means after the elapse of the time period set for each user by said setting means.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 10 is a block diagram showing the construction of the operation panel;

DETAILED DESCRIPTION OF THE PREFERRED EMBODIMENTS

Figure 1:
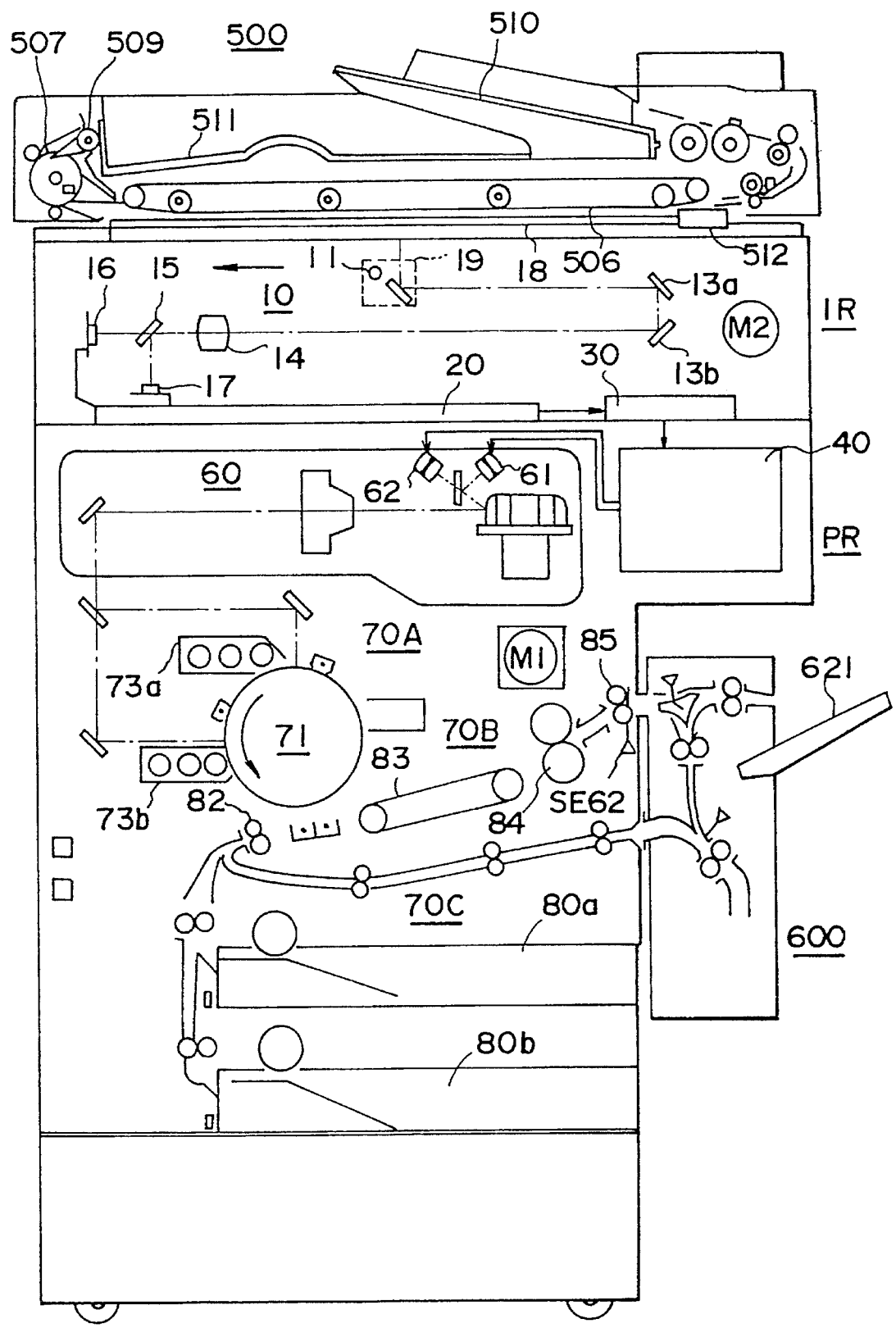
FIG. 1 is a front elevation view in section showing the construction of the copying apparatus of the present invention.

FIG. 1 is a front elevation view in section showing the general construction of the copying apparatus 1 of the present invention.

The copying apparatus 1 is a digital type copying apparatus capable of two-color copying, and comprises a basic unit consisting of the image reader unit IR and page printer unit PR, and an automatic duplex document feeder (ADFR) 500 and sheet recycling device 600.

The image reader unit IR comprises a scanning unit 10 which separates two colors when reading an original document disposed on the document platen 18, image signal processing section 20 which executes signal processing in accordance with the various image forming modes and quantization of the photoelectric conversion signals output from the scanning unit 10, and a memory section 30 for storing image data corresponding to the original document.

The scanning unit 10 is an image reading mechanism of the line scanning type comprising a scanner 19 with a document exposure lamp 11 attached thereto, stationary mirrors 13a and 13b, condenser lens 14, dichroic mirror 15, dual image sensors 16 and 17, and scanning motor M2 for driving the scanner 19. The image signal processing section 20 comprises an analog-to-digital (A/D) converting section, shading correction section, color discriminating section for discriminating the color of image elements of the original document, variable magnification processing section, image quality correcting section and the like. Memory 30 is described later.

Provided above the image reader unit IR are provided an operation panel OP to be described later, and an aperture into which is inserted a card (so-called key card) required whenever the copying apparatus is to be used.

The page printer unit PR comprises a print head 60 having as it light sources the semiconductor lasers 61 and 62, developing and transfer unit 70A having a photosensitive drum 71 and two developing devices 73a and 73b and the like, fixing and discharge unit 70B having a pair of fixing rollers 84 and a discharge roller 85 and the like, and a sheet transporting unit 70C having various rollers and a transport belt 83. The page printer unit PR forms (prints) copy images by means of an electrophotographic process based on the image data transmitted from the image reader unit IR. Below the page printer unit PR are provided two paper cassettes 80a and 80b capable of accommodating several hundred sheets of copy paper.

The automatic duplex document feeder 500 feeds original documents disposed on the document feed tray 510 onto the document platen 18 via the transport belt 506, and discharges the original document after reading to the discharge tray 511 via the discharge roller 509.

When, for example, an original document comprising a plurality of sheets is copied, the operator using the copying apparatus 1 stacks the original documents face up on the top of the feeder 500. Original documents placed on the document tray 510, whether single-sided or duplex originals, are fed sheet by sheet from the lowermost portion of the stack, and precisely positioned at a predetermined position on the document platen 18 with the image surface facing downward. In the case of single-sided copies, the original document is fed leftward in the drawing after it has been read, and discharged with the image surface facing upward. In the case of duplex copies, the original document is fed leftward after the front image surface has been read, and the sheet is reversed front-to-back by means of the inverting roller 507, whereupon said sheet is returned to the predetermined position on the document platen 18, and after the back image surface has been read, said sheet is discharged.

The sheet recycling device 600 is provided to completely automate the handling of duplex copies and composite copies, i.e., to eliminate manual handling of the copies. A copy sheet discharged from the page printer unit PR is once accommodated by the sheet recycling device 600. In the case of duplex copies, the copy sheet is inverted front-to-back and fed to the page printer unit PR, whereas in the case of composite copies, the copy sheet is fed to the page printer unit PR without being inverted front-to-back. In both duplex and composite copies, the sheet transport unit 70C of the page printer unit PR feeds the arriving copy sheet again to the transfer position.

Figure 2:
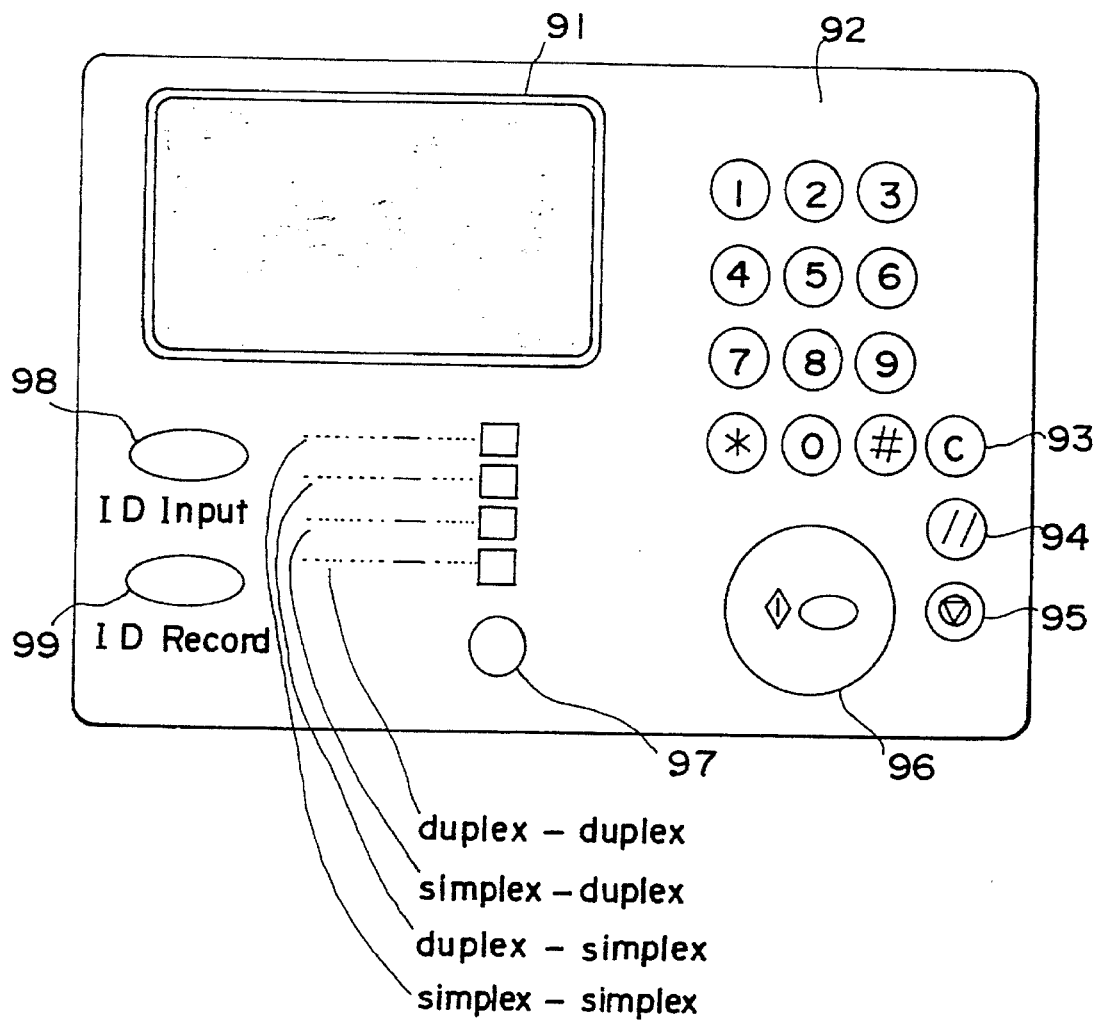
FIG. 2 is a top plan view showing the construction of the operation panel.

FIG. 2 is a top plan view showing the construction of the operation panel OP. FIG. 3 is an illustration showing the operation sequence for the usable states of the copying apparatus 1.

The operation panel OP is provided with a liquid crystal touch panel 91, ten-key pad 92, clear key 93, panel reset key 94; stop key 95, start key 96, copy mode selection key 97, and ID input key 98 and ID recording key 99. The liquid crystal touch panel 91 is provided for status display such as various multiple operation modes, jam conditions, paper empty condition and the like.

Figure 3A:
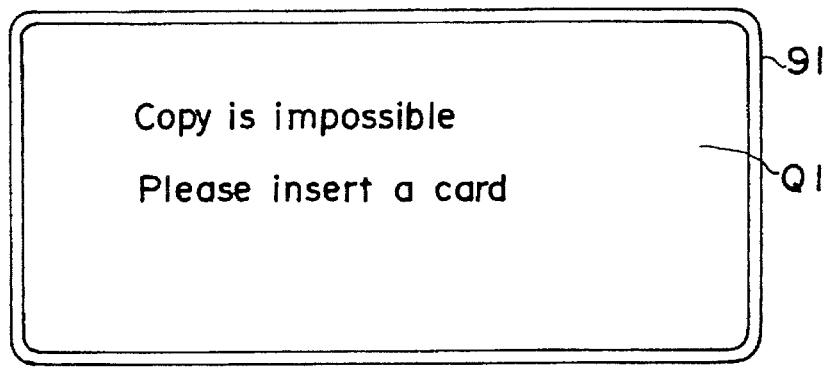
FIG. 3a, 3b, 3c is an illustration showing the operating sequence for the usable states of the copying apparatus.

As shown in FIG. 3a, when a key card has not been loaded, a screen Q1 is displayed on the liquid crystal touch panel 91 which alerts the user to insert the key card. That is, the copying apparatus 1 cannot be operated unless a standard key card has been inserted, even when the power is turned on. After a key card has been inserted, the display contents of the liquid crystal touch panel 91 changes in accordance with the operation.

Figure 3B:
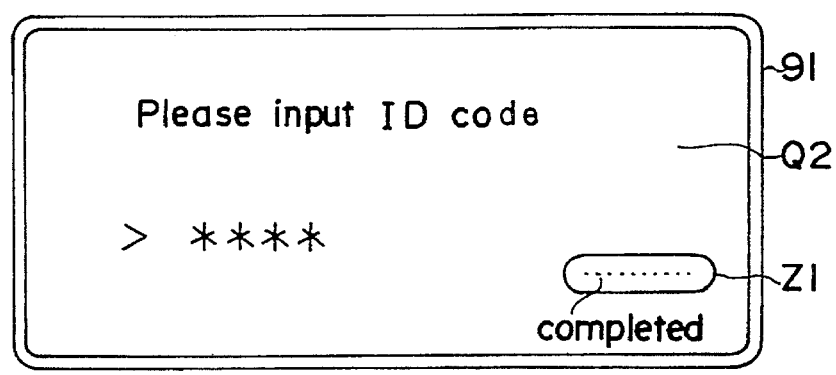
Figure 3C:
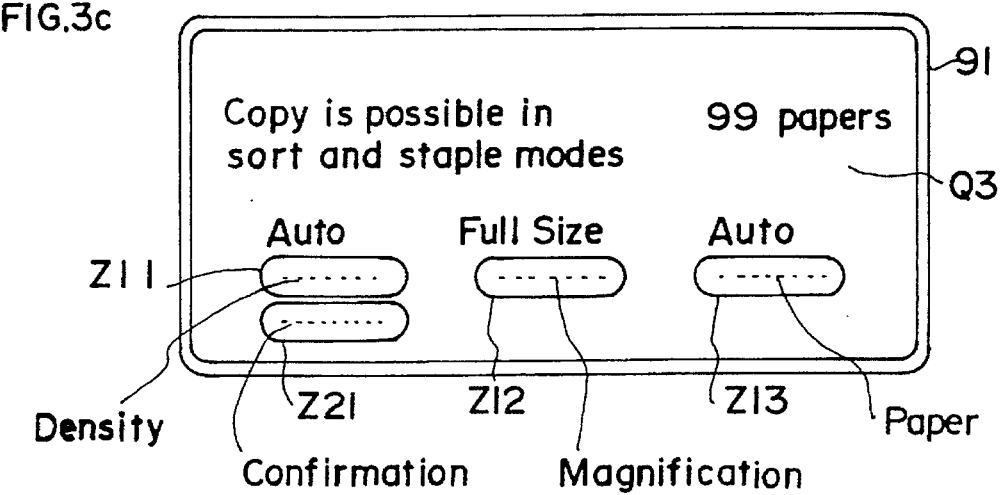

Taking a different approach, when the user depresses (ON state) the ID input key 98, a screen Q2 is displayed requesting ID code input, as shown in FIG. 3b. The user enters his/her own ID code (four digit code number) using the ten-key pad 92, then touches the input complete button Z1 on screen Q2 (ON state). Use of the copying apparatus 1 is enabled by the ID code input, and screen Q3 is displayed to set the copy mode, as shown in FIG. 3c.

The screen Q3 displays copy condition setting buttons Z11, Z12 and Z13 for specifying density, magnification, paper size respectively, as well as an image verification button Z21 for setting the image verification mode.

Figure 4:
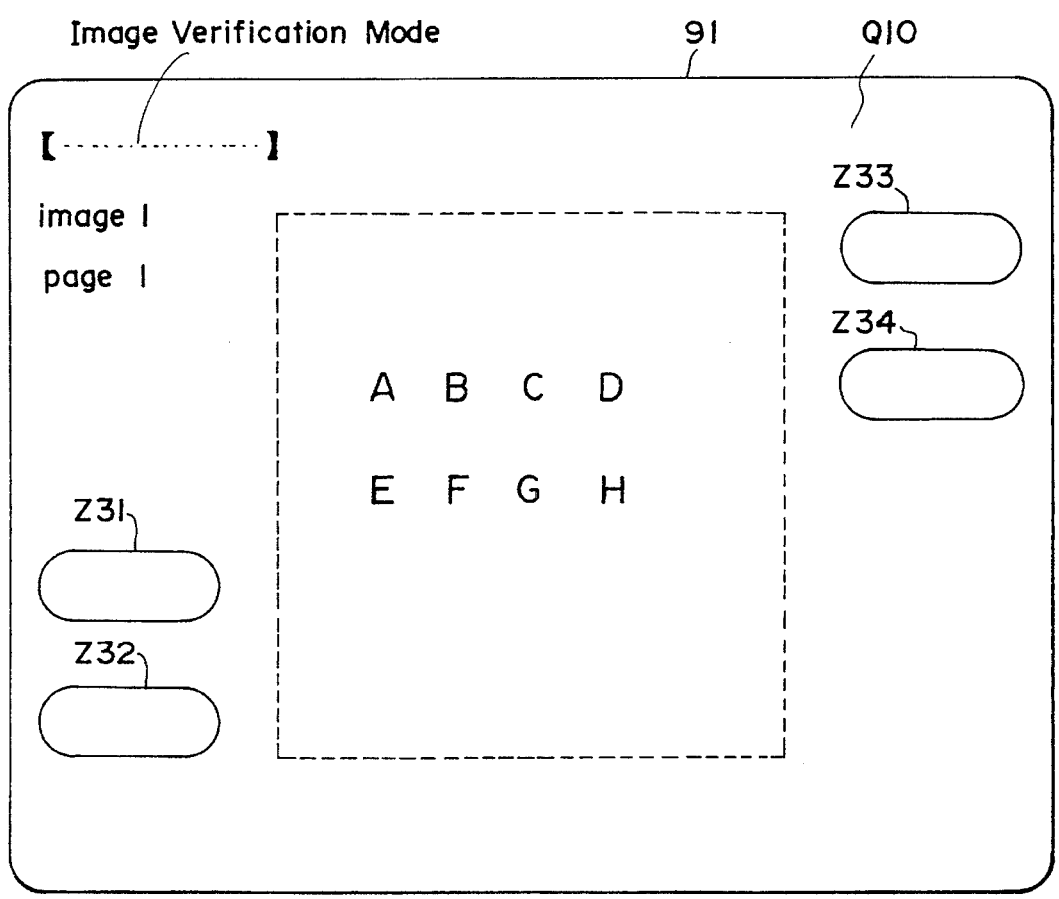
FIG. 4 is an illustration an example of the screen display of the image verification mode.

The image verification mode allows the user to verify the image information (document) contents stored in memory section 30 prior to printing. When a user turns ON the image verification button Z21, a screen Q10 is displayed, as shown in FIG. 4. The screen Q10 displays the image number (document number) and page number in the upper left of the screen, and centrally displays the image read from the memory 304 (described later). The screen Q10 further displays the execute button Z31 for specifying the printing of the displayed image, cancel button Z32 for cancelling the image verification mode, and previous image button Z33 and next image button Z34 for changing the displayed image (switching the displayed image to another image number). In the copying apparatus 1, the image verification mode is initialized so as to display the image of the first page.

Figure 5:
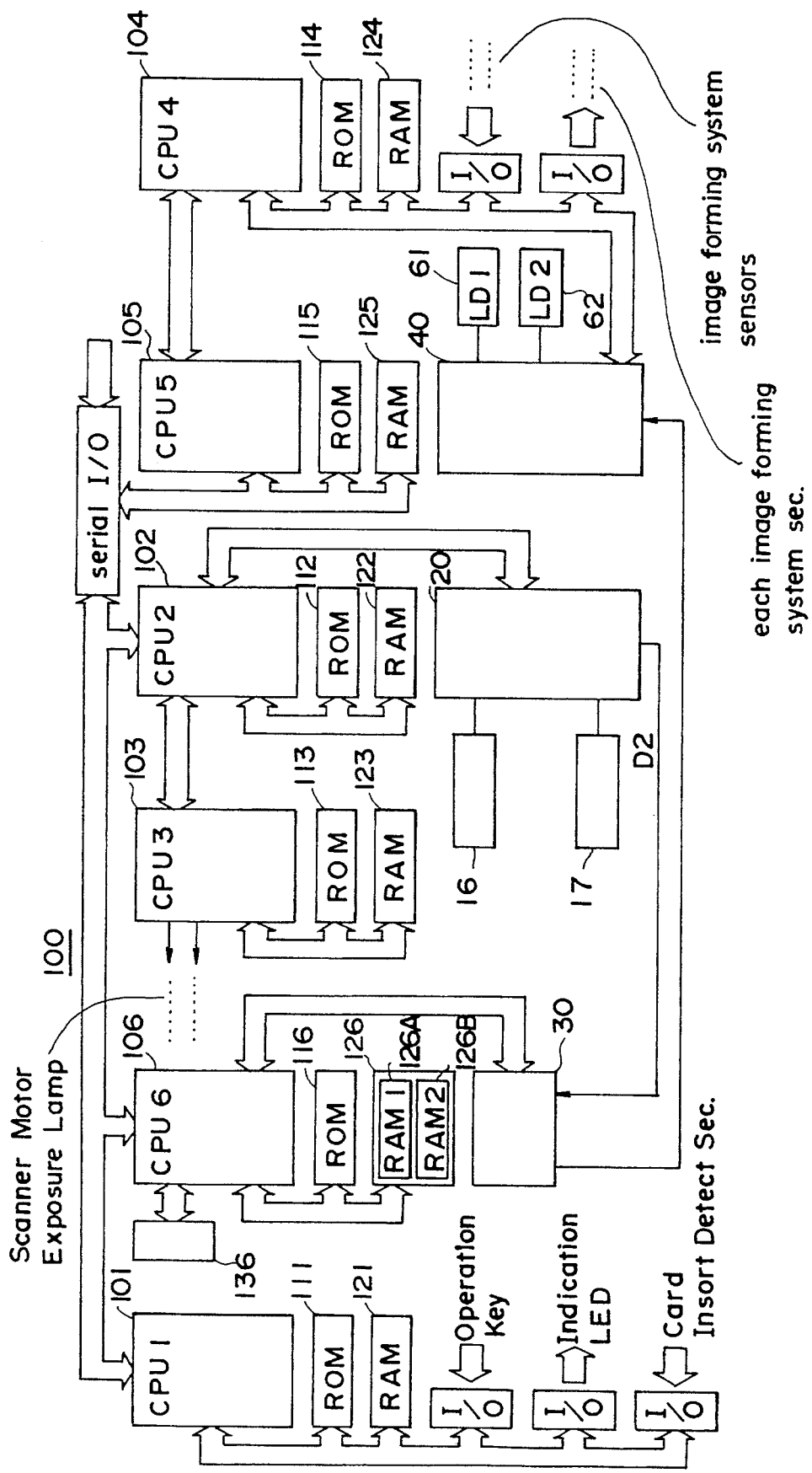
FIG. 5 is a block diagram construction of the control portion of the copying apparatus.
Figures 6, 7:
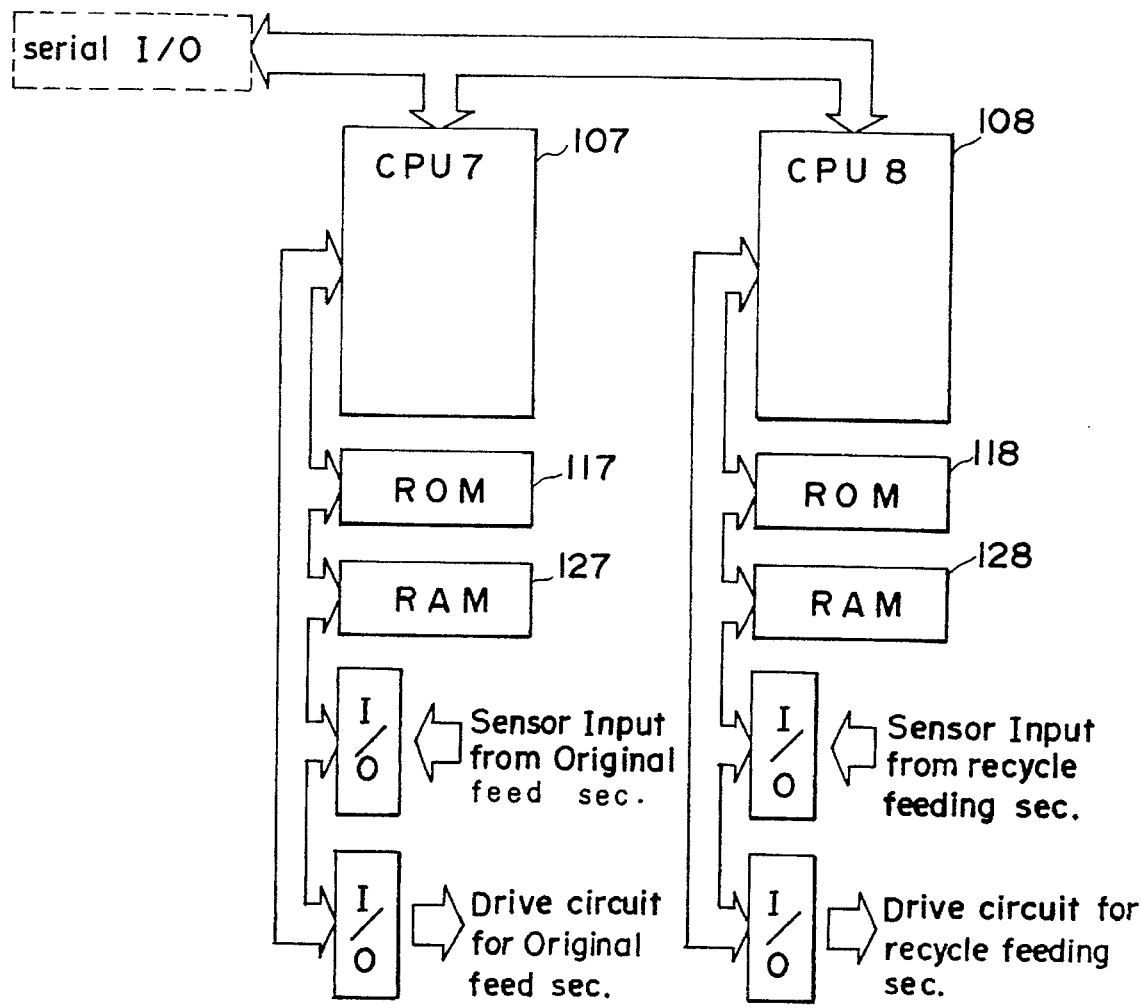
FIG. 6 is a block diagram showing the construction of the control portion of the copying apparatus.
FIG. 7 is an illustration showing the contents of the memory erase specified information table.

FIGS. 5 and 6 are block diagrams showing the construction of the control portion of the copying apparatus 1.

The control portion 100 mainly comprises eight individual central processing units (CPU) 101 through 108. These CPUs 101~108 are provided with read only memories (ROM) 111–118 for storing the respective programs of the CPUs 101–108, and random access memories (RAM) 121–128 as work areas for program execution. Serial communications are executed among the CPUs 101–108 via interrupt processes, so as to allow reception of commands and reports required for control and other data.

The CPU 101 controls the operation panel OP and controls related to the card insertion detection section (not illustrated). The CPU 102 controls the various parts of the image signal processing section 20. CPU 103 controls the actuation of the scanning unit 10. CPU 104 controls the page printer unit PR, and CPU 105 controls the processes for setting the overall timing adjustment and operation modes of the control portion 100.

CPU 106 controls the memory section 30, i.e., controls the storing and reading of image information correction to original documents. Therefore, the RAM 126 corresponding to the CPU 106 comprises a RAM 126A for storing the memory erase information table IT (refer to FIG. 7) corresponding to the ID code and memory erase timing (memory maintaining time after printing), and RAM 126B for storing the management table MT1 described later. The RAM 126A is a nonvolatile RAM provided with battery backup. The CPU 108 is provided with a clock 136 for timing the memory erasure.

The CPU 107 controls the automatic duplex document feeder 500, and the CPU 108 controls the sheet recycling device 600.

The memory section 30 provided for the realization of the memory mode copying is described hereinafter.

Figure 8:
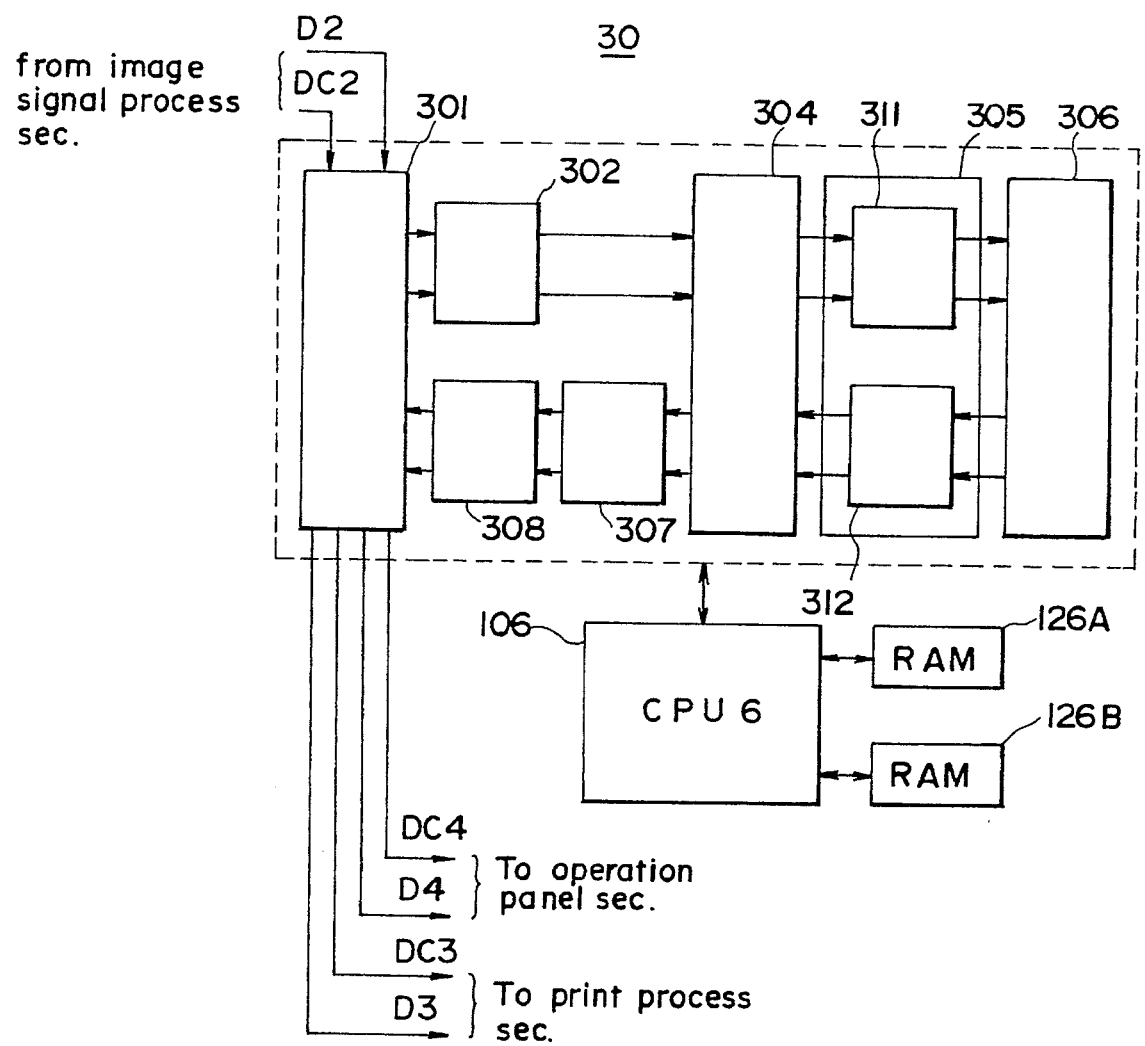
FIG. 8 is a block diagram showing the construction of the memory portion.

FIG. 8 is a block diagram showing the construction of the memory section 30.

Memory section 30 comprises image selection section 301, binarizer 302, multiport image memory 304, encode processing section 305 having a compressor 311 and expander 312, multiport code memory 306, rotation section 307, and multilevel converter 308, so as to be capable of compressing and storing image information for the memory of small capacity quantization.

The 8-bit image data D2 from the image signal process section 20 and the 1-bit color data DC2, i.e., the color discrimination data for each image element of the original image, are input to the memory section 30. These data D2 and DC2 are transmitted to the binarizer 302 via the image selection section 301.

The binarizer 302 processes the conversion of multi-level image data D2 into binary image data within a refreshable range using, for example, a dither method. After binarization, the image data are temporarily written to the image memory 304 with the color data DC2.

The encode section 305 reads the image data written to the image memory 304, compresses said data, and generates encoded (compressed) data which are then written to the code memory 306. The encode section 305 reads the coded data for printing and image verification from the code memory 306, expands said data, and writes the obtained image data to the image memory 304 in accordance with instruction from the CPU 106. The compressor 311 and the expander 312 are capable of operating independently of one another in parallel operation so as to improve copy speed. Direct memory access (DMA) transfer of data is accomplished among the compressor 311 and expander 312 and code memory 306 via the DMA controller.

When the one-page image data are regenerated via expansion, the CPU 106 reads the image data from the image memory 304 and transmits said image data to the rotation section 307. The rotation section 307 executes the rotation process (a process to coordinate the arrangement relation between the copy image and the copy sheet) as required, and transmits the binary image data to the multi-level converter 308.

In contrast to the binarizer, the mult-level converter 308 estimates the multi-level values needed to regenerate the binary data dot array so as to return the binary data to its original form when printing. Conversely, during image verification, the binary data call be used directly to display on the liquid crystal touch panel 91 and, therefore, the multi-level converter 308 enters the data throughput state.

The image selector section 301 during printing outputs the image data regenerated by the multi-level converter 308 to the print process section 40 as image data D3. During image verification, the image selector section 301 outputs the binary data to the operation panel section 130 (described later) as image data D4.

In the memory section 30, the code memory 306 manages data by means of the management table MT1 stored in RAM 126B. That is, when image information is stored in memory, the CPU 106 generates the management information of the management table MT1, controls the compressor 311, and sequentially stores the encoded data in code memory 306. When image information is transmitted, the CPU 106 reads the encoded data from the code memory 306 in reverse operation to that for storing said information.

Figures 9A, 9B:
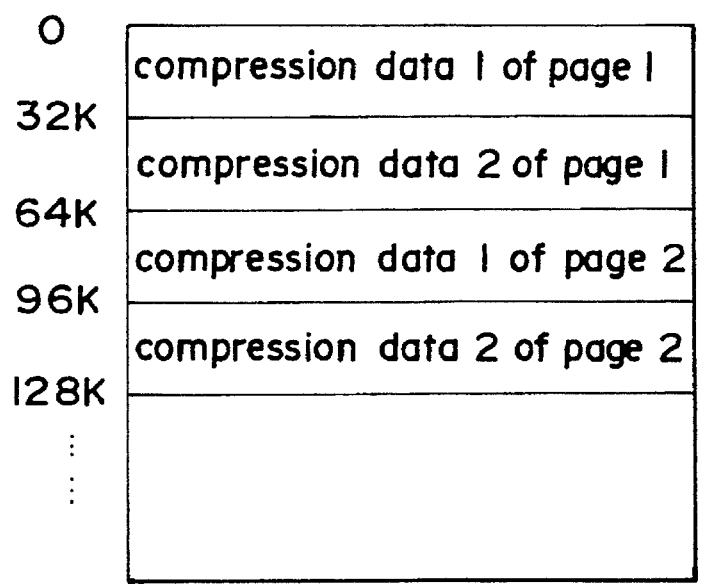
FIG. 9a, 9b is an illustration showing the relationship between the management table and the code memory.

FIG. 9a, 9b is an illustration showing the relationship between the management table MT1 and the code memory 306.

The code memory 306 is partitioned into individual 32 kilobyte memory areas. Only encoded data corresponding to a single page are stored in these memory areas for easily executing a process of storing to the memory and a process of reading from the memory in parallel.

On the other hand, the management table MT1 stores the various appended information such as the number expressing each memory area of the code memory 306, page number, numbers of linked areas, compression method and data length, and ID codes and the like required for the compression and expansion processes. The management table MT1 automatically manages the code memory 306 based on these stored data.

For example, when looking at the one-page information shown in FIG. 9a, we can see the data [00] in the "prior link" section; the one-page information exists in the area of memory number [00] of the code memory 306. We can also see the data [01] in the "after link" section; the one-page information exists in the area of memory number [01]. The "after link" data [FF] indicates the one-page information does not exist in subsequent numbers of the memory area.

FIG. 10 is a block diagram showing the construction of the operation panel section 130.

The image data D4 and color data DC4 output from the memory section 30 are adapted for the liquid crystal touch panel 91 in the display adjustment section 131, and are written to the display memory 132 after the display position has been adjusted. At this time, the transmission of the image data D4 and is a DMA transmission that does not require control of the CPU 101.

The graphics and characters such as the operation buttons and the like displayed on the liquid crystal touch panel 91 are written to the display memory 132 via the control of the CPU 101. The contents written to the display memory 132 are transmitted to the liquid crystal touch panel 92 through the I/O port.

The operation and control of the copying apparatus 1 are described hereinafter with reference to the flow charts.

Operation of CPU 101

Figure 11:
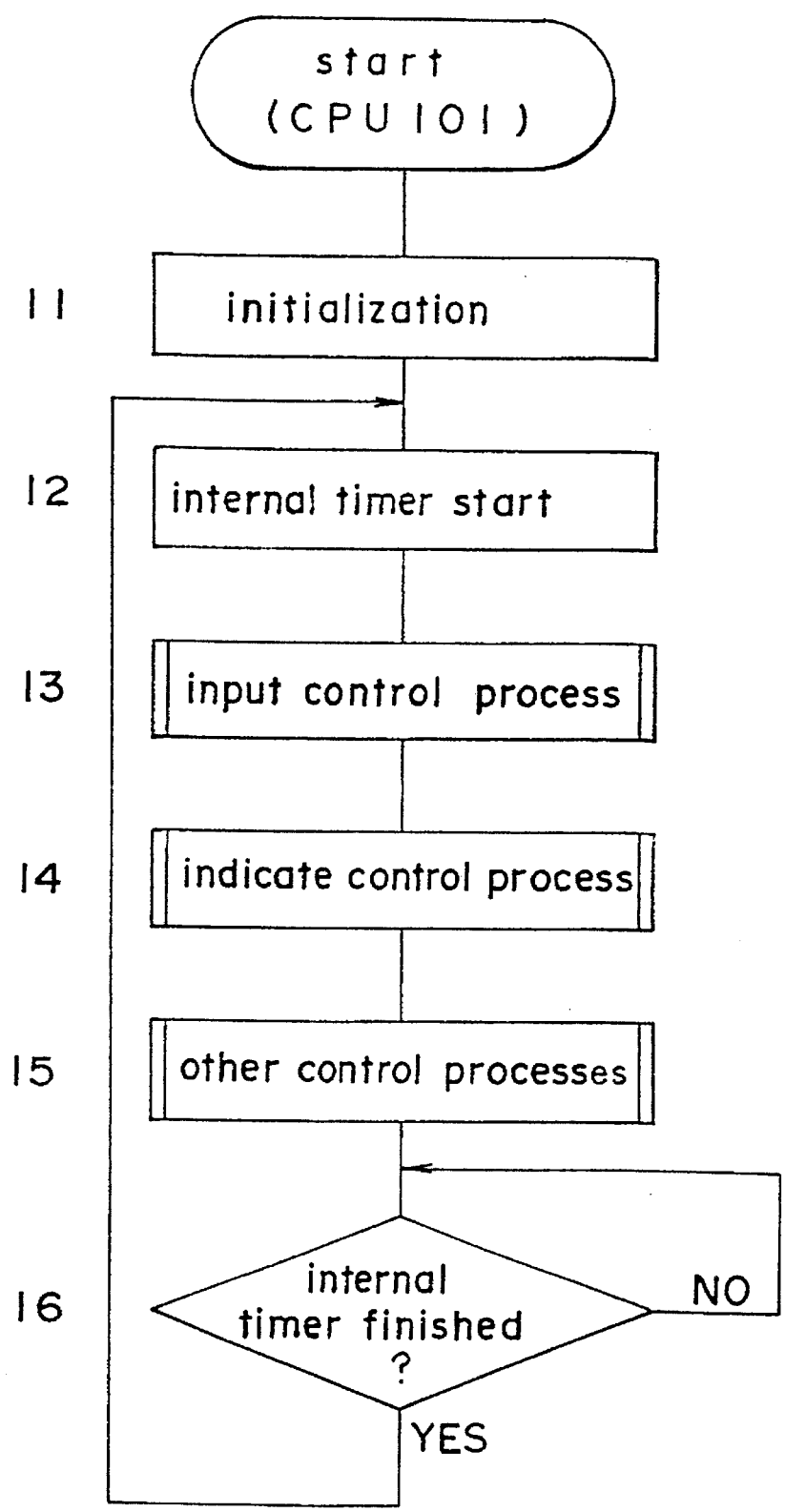
FIG. 11 is a flow chart of the main routine of the CPU controlling the operation panel.

FIG. 11 is a flow chart showing the main routine of the CPU 101 for controlling the operation panel OP.

After initialization (#11), the CPU 101 repeatedly executes the input control process, display control process, and other processes each cycle set by an internal timer (#12–#16). The CPU 101 executes communications (interrupt processes) with the CPUs 102–108 at the appropriate times.

Input Control Process

Figure 12:
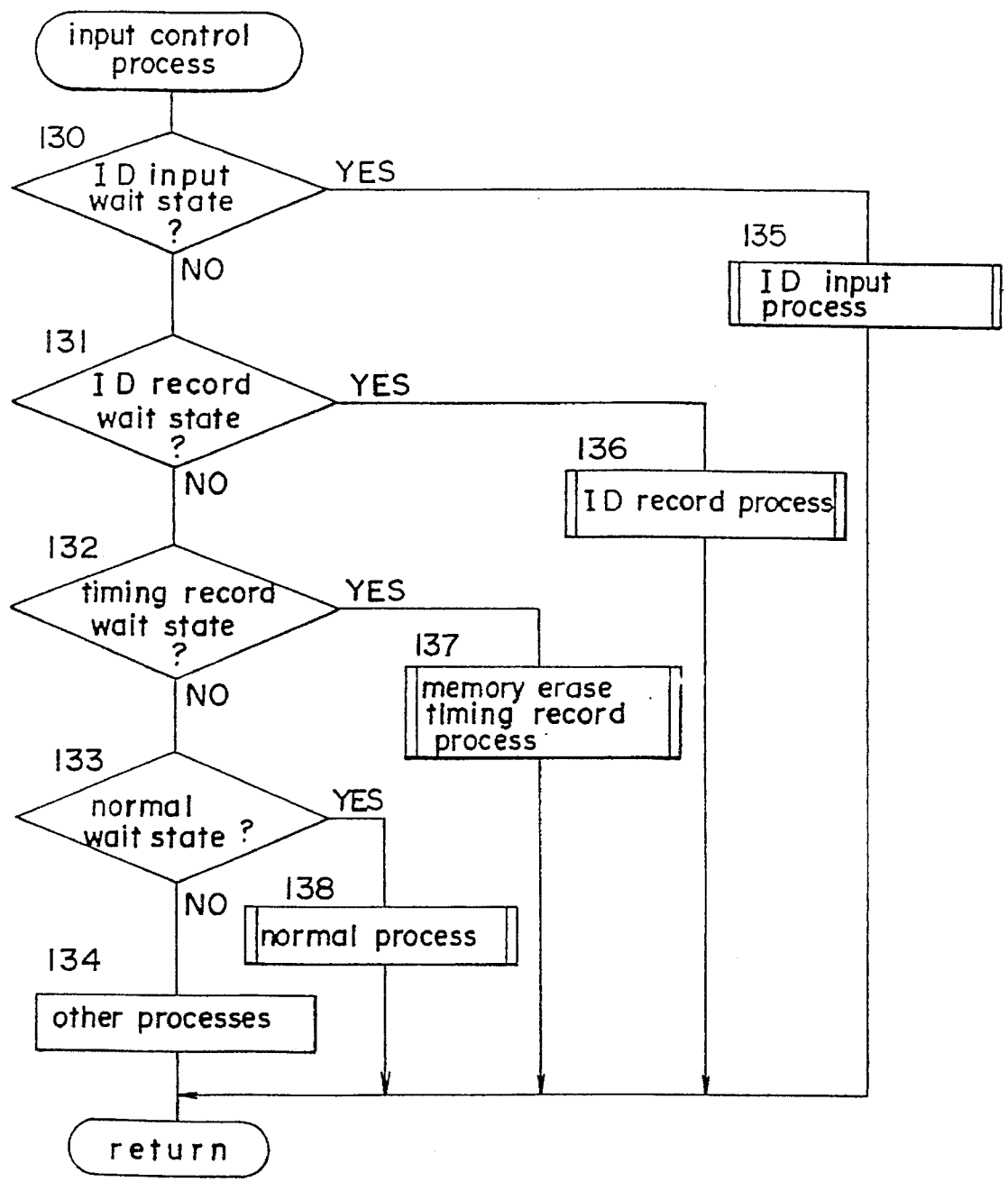
FIG. 12 is a flow chart briefly showing the contents of the input control process of FIG. 11.

FIG. 12 is a flow chart briefly showing the contents of the input control process (#13). In this subroutine, the CPU 101 discriminates the state of the copying apparatus 1 in the transitions in conjunction with the operation progress, and executes specified processes relating to the various conditions in accordance with the results of said discrimination.

That is, the CPU 101 executes the ID input process (#130, #135) when the ID input wait state is operative, executes the ID record process (#131, #136) when the ID record wait state is operative, executes the memory erase timing record process (#132, #137) when the timing record wait state is operative, executes the normal process (key input process) (#133, #138) when the normal wait state is operative, and executes other processes (#134) when none of the aforesaid four wait states are operative.

The ID input wait state is a state wherein a recorded ID code input operation is awaited (ID code recorded in the memory erase information table IT). This state is produced by switching ON the ID key 98 at an appropriate time.

The ID record wait state is the state wherein the input of an unrecorded ID code is awaited. The timing record wait state is the state wherein the memory erase timing input is awaited. These two states are produced by the user him/herself by switching ON of the ID record key 99 for recording an optimal memory erase timing.

The normal wait state is the state wherein the switching ON of optional keys, i.e., some operation, is awaited. For example, the state of the copying apparatus 1 after power is turned ON and warmup is completed is the normal wait state.

Other states include the print stop state corresponding to the switching ON of the stop key 95, and the state during the execution of the interrupt process and the like.

The contents of the normal process, ID input process, ID record process, memory erase timing record process are described sequentially hereinafter.

Normal Process

Figure 13:
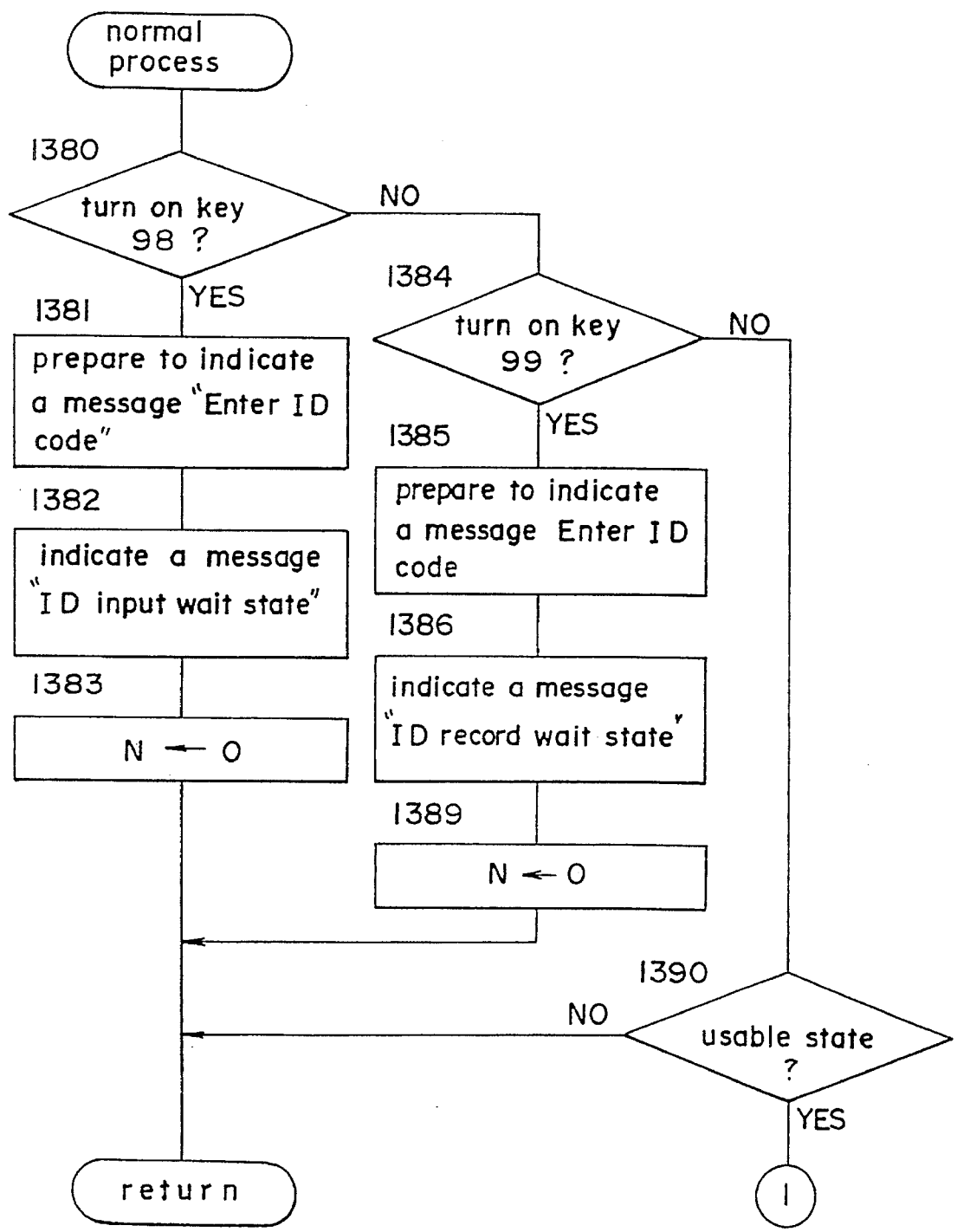
FIG. 13 is a flow chart showing the contents of the normal process of FIG. 12.
Figure 14:
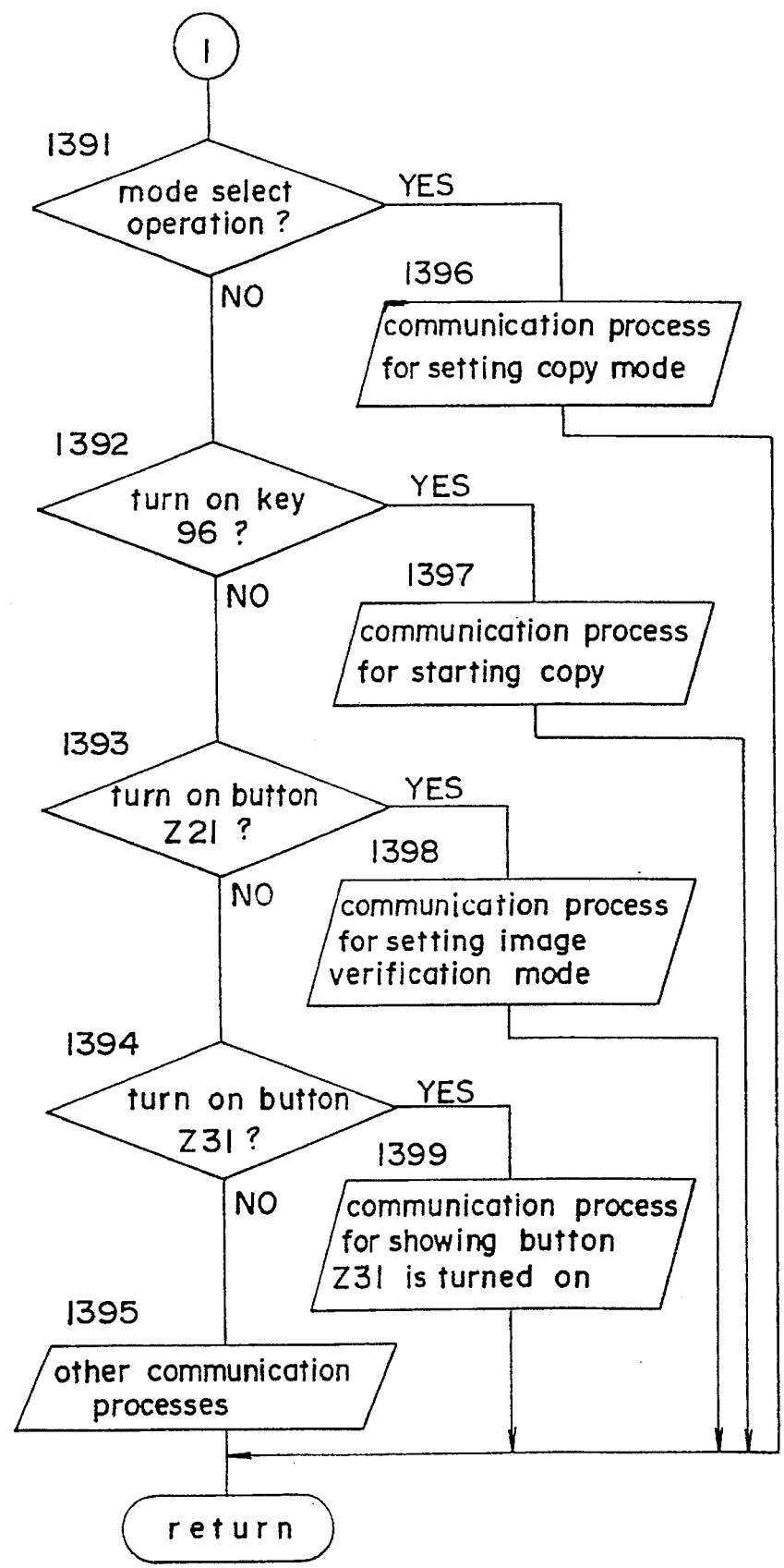
FIG. 14 is a flow chart showing the contents of the normal process of FIG. 12.

FIGS. 13 and 14 are flow charts showing the contents of the normal process of FIG. 12 (#138).

When a user turns ON the ID input key 98, the CPU 101 creates the display data for the message "Enter ID Code," and displays this message as screen Q2, as shown in FIG. 3, and thereafter, the CPU 101 sets the columns number N, equivalent to the number of times the ten-key pad is turned ON, at [0] (#1380 through #1383). The user is thereby alerted that the copying apparatus 1 is in the ID input wait state via the aforesaid message display.

When a user turns ON the ID record key 99, the CPU 101 creates the display data for the message "Enter ID Code." This message is displayed, and the number of digits N is set at [0] (#1384 through #1390).

Thus, in the normal mode, the CPU 101 effectively turns ON the ID input key 98 and ID record key 99 whenever required. However, the other keys as well as the buttons on the liquid crystal touch panel 91 are effectively turned ON only when the copying apparatus 1 is in the operable state (state in which flags are set is described later) (#1390).

As shown in FIG. 14, in the operable state, the CPU 101 executes the communication process (#1391, #1396) for posting the selected mode called for by the mode selection process, executes the communication process (#1392, #1397) for starting the copy process called for by turning ON the start key 96, executes;the communication process (#1393, #1398) for setting the image verification mode called for by switching ON the image verification button Z21, executes the communication process (#1394, #1399) for posting the ON state of the execute button Z31, and executes the other communication processes (#1395) called for by other operations. In the case of each process, the CPU 101 transmits specific data to the CPU 105.

ID Input Process

Figure 15:
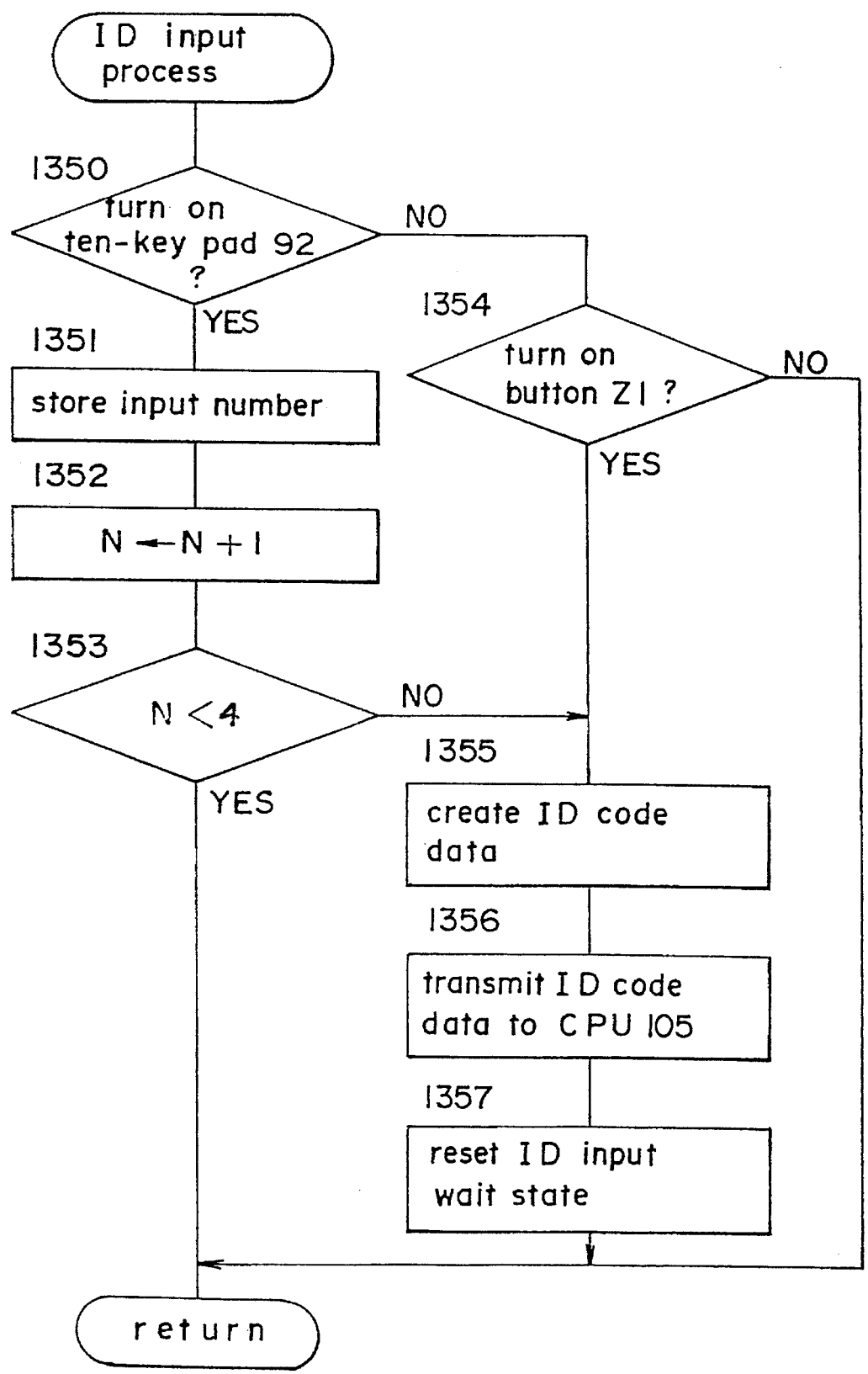
FIG. 15 is a flow chart showing the contents of the ID input process of FIG. 12.

FIG. 15 is a flow chart showing the contents of the ID input process (#135) of FIG. 12.

As previously described, a user must input a previously recorded ID code whenever the copying apparatus 1 is used. Recordable ID codes contains one to four digits. A user inputs four numerals or one to three numerals via the ten-key pad 92, then turns ON the input complete button Z1 to complete the ID code input operation.

When a user turns ON the ten-key pad 92, the CPU 101 adds [1] to the number of digits N and stores the input number in memory (#1350–#1352). When the number of digits N reaches [4] (#1353), or when the ON state of the input complete button Z1 is detected (#1354), the CPU 101 creates the ID code data corresponding to the numerals stored in memory and transmits said data to CPU 105 (#1355, #1356), then resets the flag indicating the ID input wait state (#1357).

ID Record Process

Figure 16:
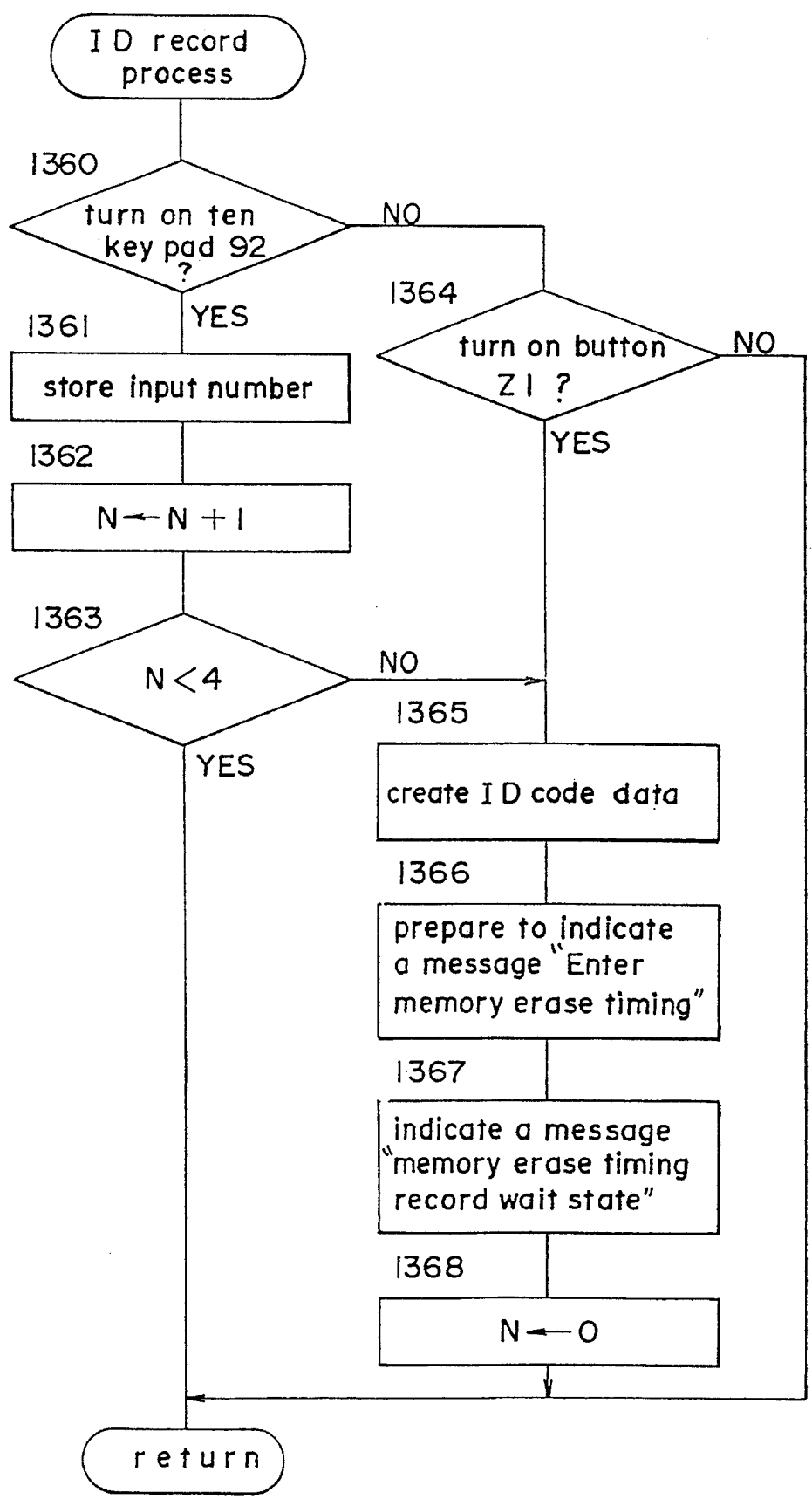
FIG. 16 is a flow chart showing the contents of the ID recording process of FIG. 12.

FIG. 16 is a flow chart showing the contents of the ID record process (#136) of FIG. 12.

The CPU 101 creates the ID code data in the same sequence as previously described for the ID input process (#1360–#1355).

After the ID code data are created, the CPU 101 creates the display data for the message "Enter Memory Erase Timing," displays this message, and returns the number of digits N to [0] (#1366–#1368). By displaying this message, a user is alerted to the fact that the copying apparatus 1 is in the timing input wait state.

Memory Erase Timing Record Process

Figure 17:
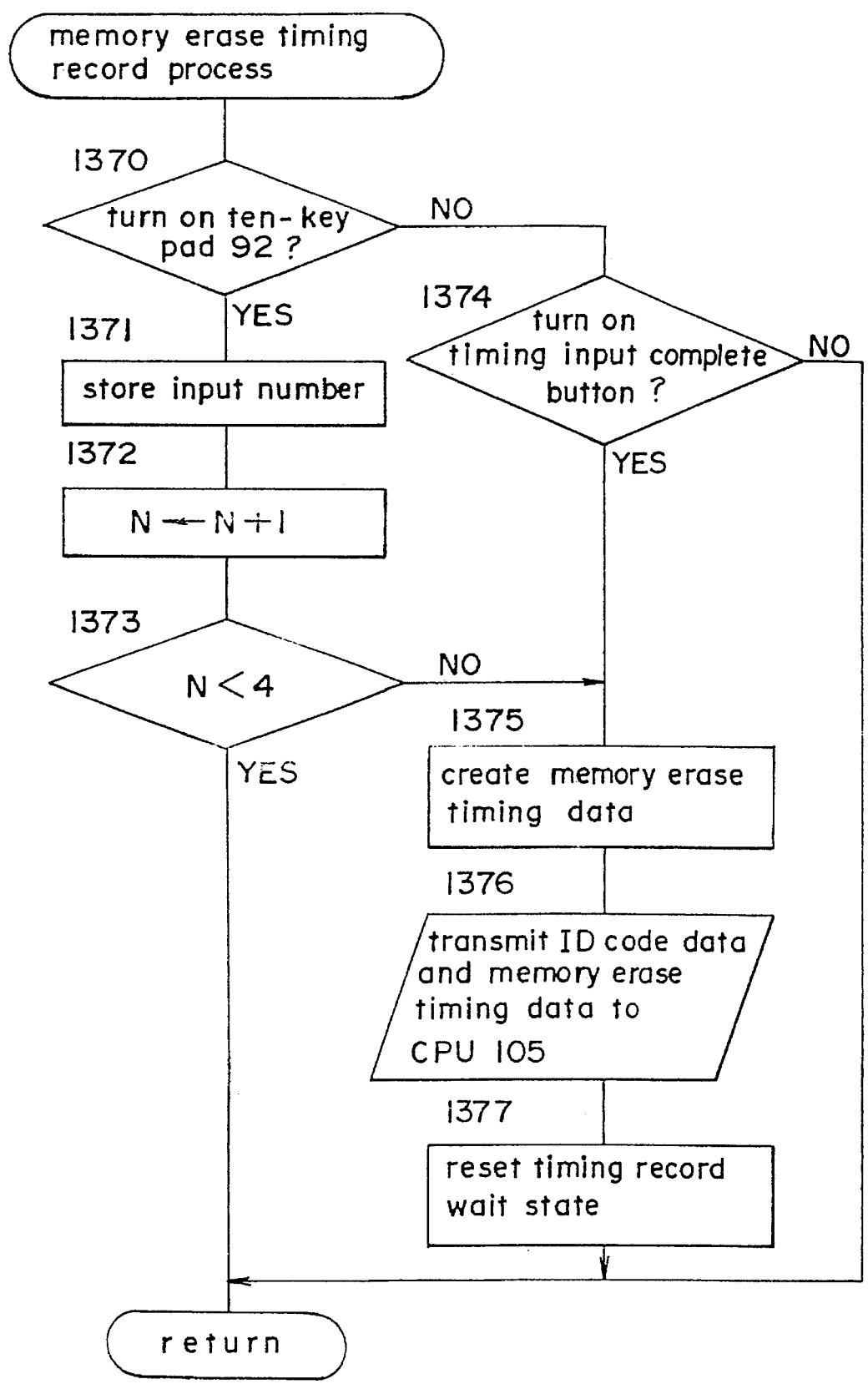
FIG. 17 is a flow chart showing the contents of the memory erase timing process of FIG. 12.

FIG. 17 is a flow chart showing the contents of the memory erase timing record process (#137) of FIG. 12.

In the copying apparatus 1, the memory erase timing may be recorded in increments of one-minute units from 0–9999. When, for example, a user sets the memory erase timing at 120 minutes, the recording operation comprises turning ON the numerical keys [1], [2], and [0] in sequence, then turning ON the timing input complete button displayed on the liquid crystal touch panel 91.

When a user turns ON the ten-key pad 92, the CPU 101 adds [1] to the number of digits N and stores the input number in memory (#1370–#1372). When the number of digits reaches four (#1373), or when the ON state of the timing input complete button is detected (#1374), the CPU 101 creates the memory erase timing data corresponding to the stored number (#1375), transmits the memory erase timing data and the ID data created in the ID record process to the CPU 105 and CPU 106 (#1376), then resets the flag indicating the timing record wait state (#1377).

The memory erase timing data and the ID code data transmitted to the CPU 106 are stored in the memory erase information table IT within the nonvolathe RAM 126A.

CPU 105 Operation

Figure 18:
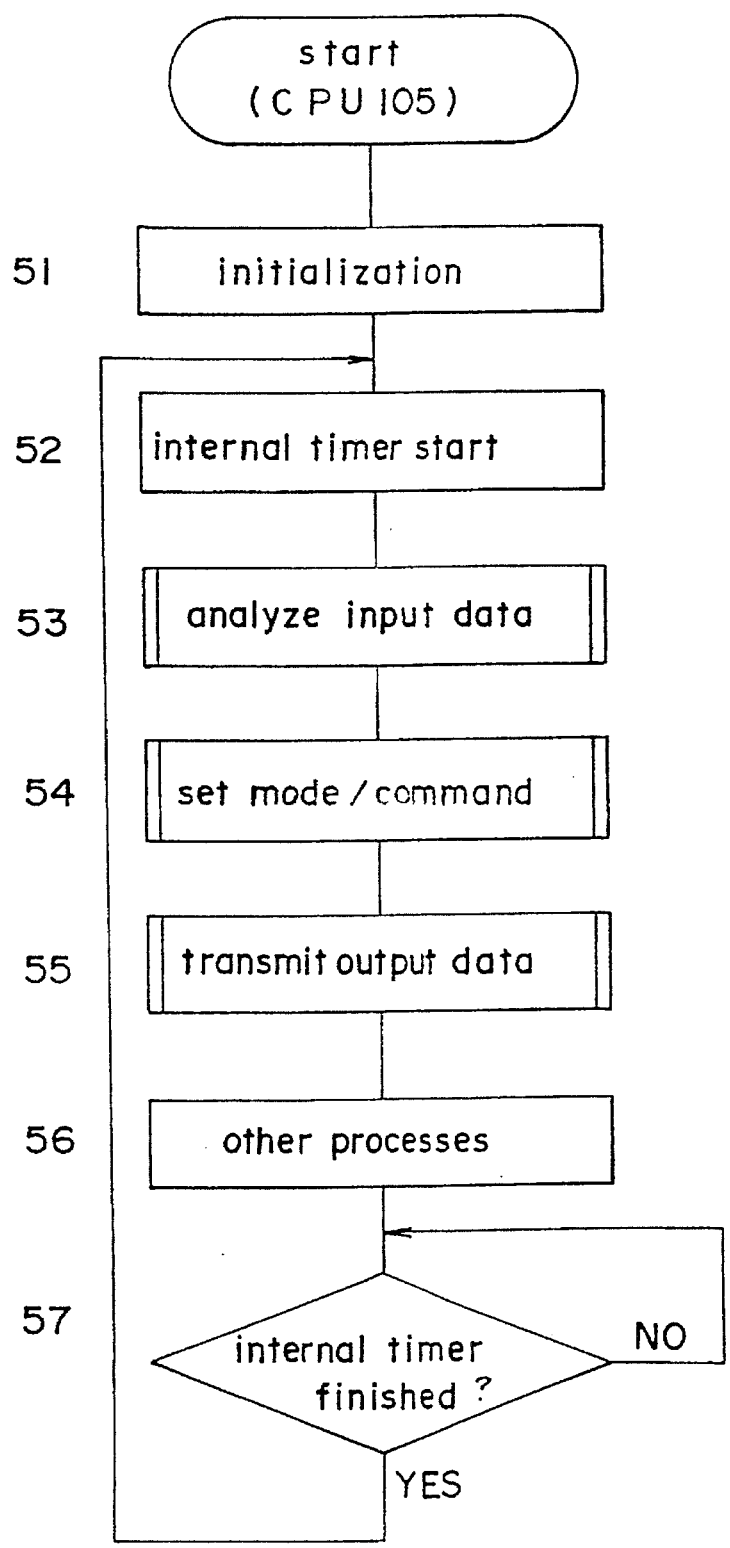
FIG. 18 is a flow chart showing the main routine of the CPU for general control of the copying apparatus.
Figure 19:
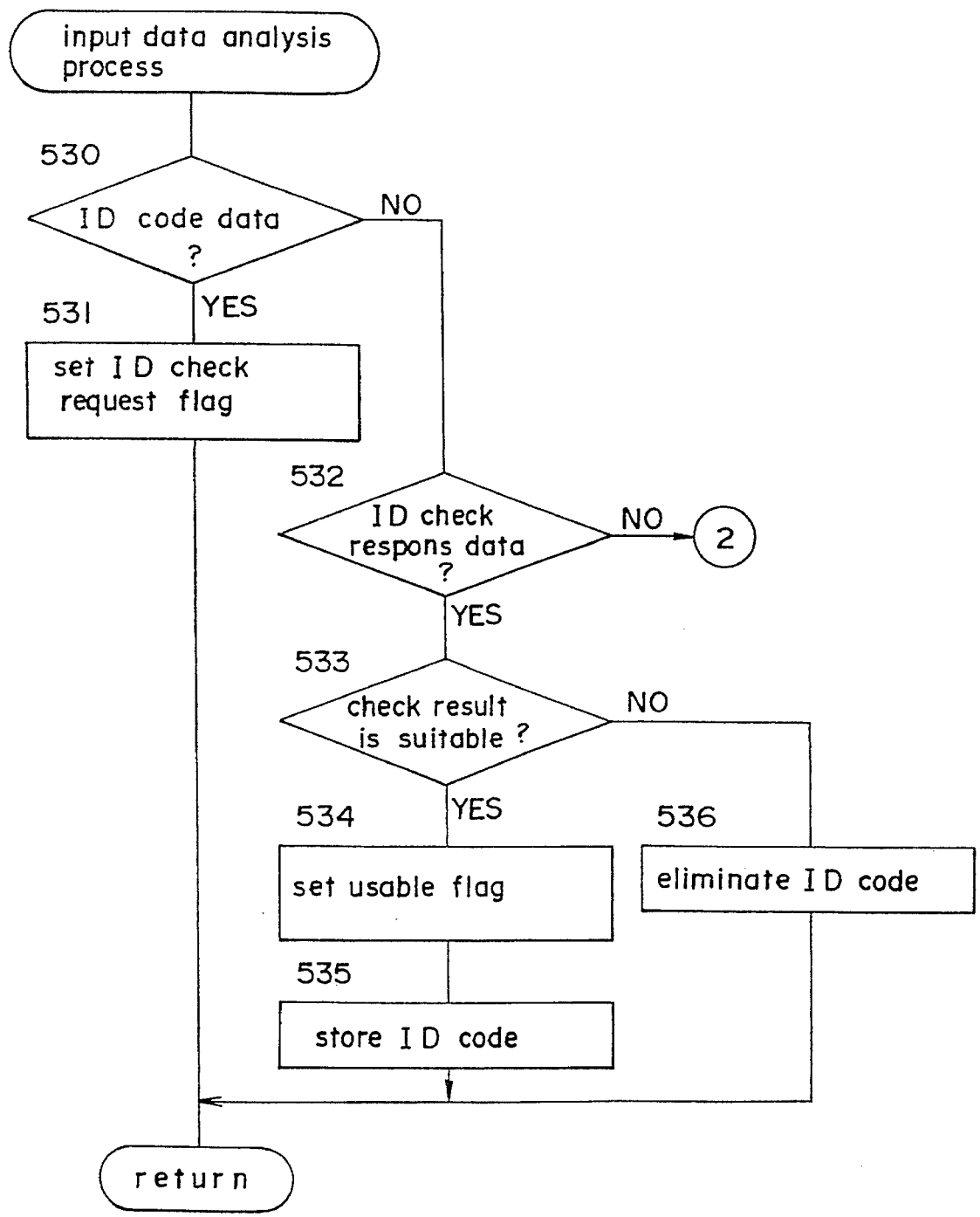
FIG. 19 is a flow chart showing the contents of the input data analysis process of FIG. 18.

FIG. 18 is a flow chart showing the main routine of the CPU 105 which controls the copying apparatus 1.

The CPU 105 analyzes the contents of the input data fetched via communication with other CPUs (#53). Based on the analysis results, commands and mode data such as magnification data and the like are set as output data (#54), and used as control data for other CPUs (#55).

Input Data Analysis Process

FIGS. 19 through 22 are flow charts showing the contents of the input data analysis process (#53) of FIG. 18.

If the input data are ID code data, the CPU 105 sets the ID check request flag as preparation for requesting an ID check by the CPU 106 (#530, #531). That is, the memory erase information table (IT) which stores the recorded ID codes is managed by the CPU 106. Therefore, the CPU 106 must be requested to check whether or not the ID code data is recorded (suitable) or unrecorded (unsuitable). On the other hand, the various communication data (including the ID check command) transmitted to other CPUs are created in a batch via the mode/command set process (#54, FIG. 18) which is separate from this subroutine, whereupon the transmission of the current communication data is accomplished by the output data transmission process (#55). Accordingly, in this subroutine, the ID code data are input, ID check command is created, and the ID check request flag is set to specify transmission.

Then, when input data are the ID check response data expressing the result of the ID check, the CPU 105 executes processing in accordance with the result of said ID check. That is, if the results indicate the user input ID code is suitable, the CPU 105 the operable flag is set to indicate the copying apparatus 1 is in the operable state, and the ID code is stored in memory (#532~535). If the results of the ID check indicate the ID code is unsuitable, the CPU 105 erases the ID code (#533, #536).

Figure 20:
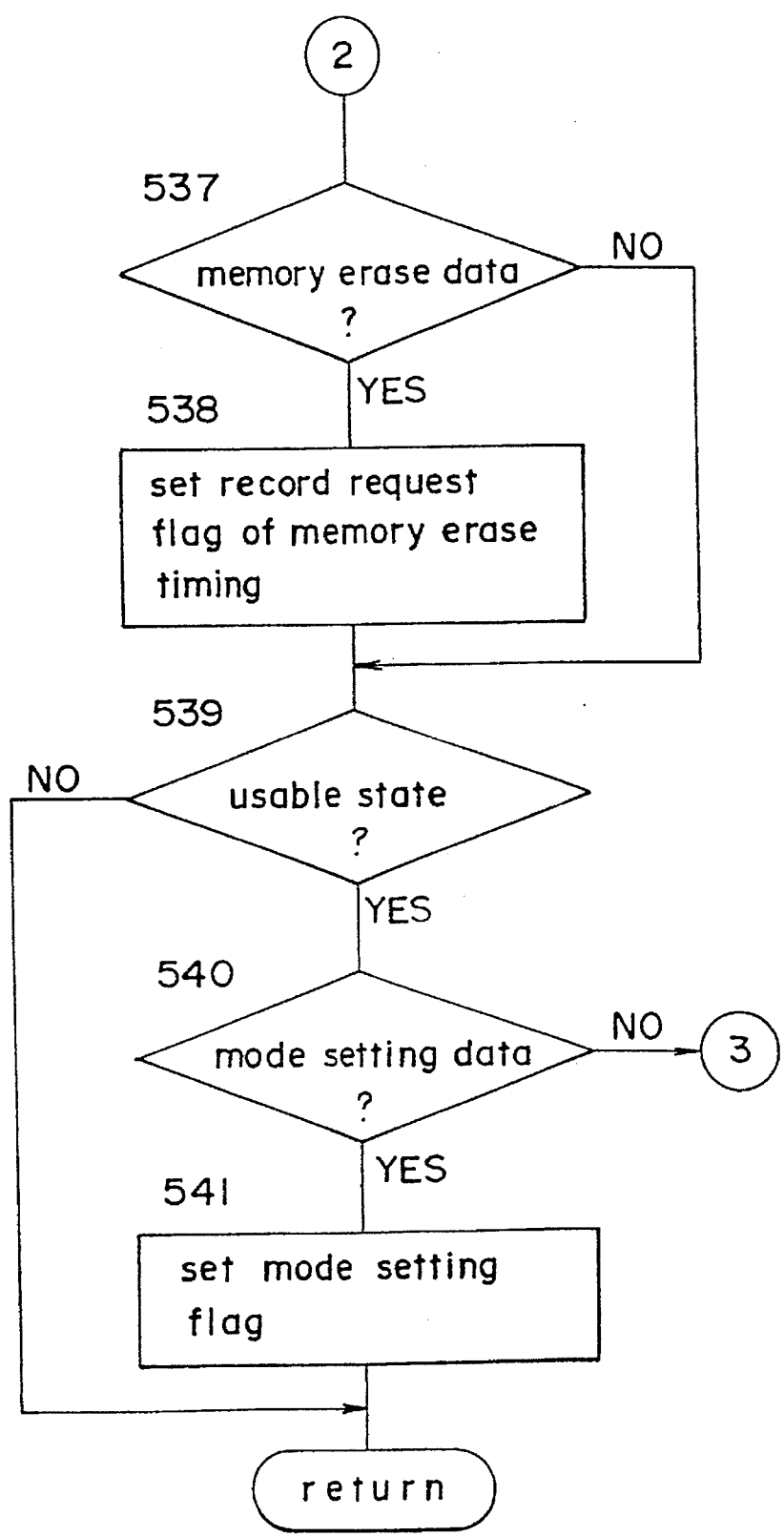
FIG. 20 is a flow chart showing the contents of the input data analysis process of FIG. 18.
Figure 21:
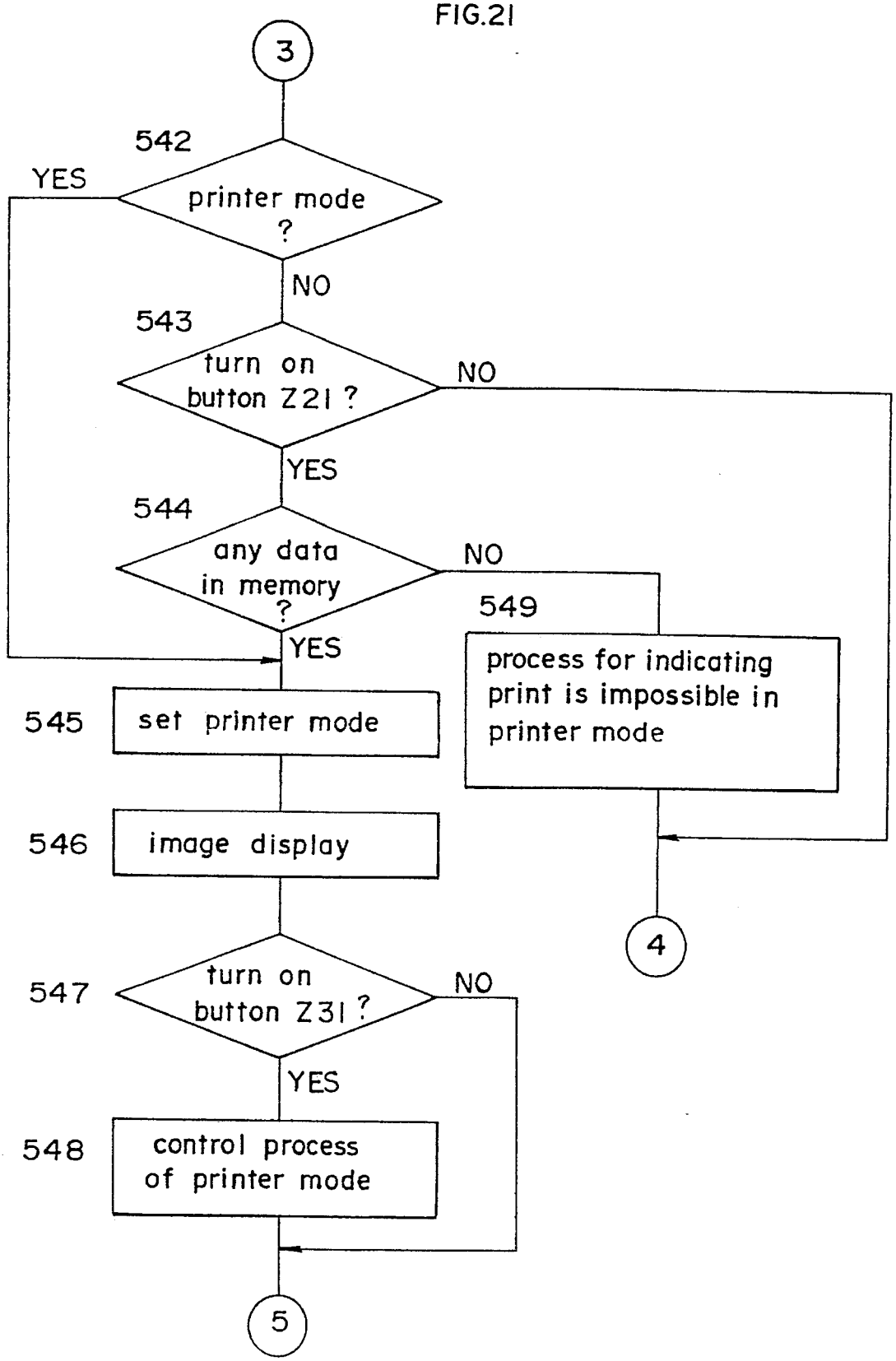
FIG. 21 is a flow chart showing the contents of the input data analysis process of FIG. 18.
Figure 22:
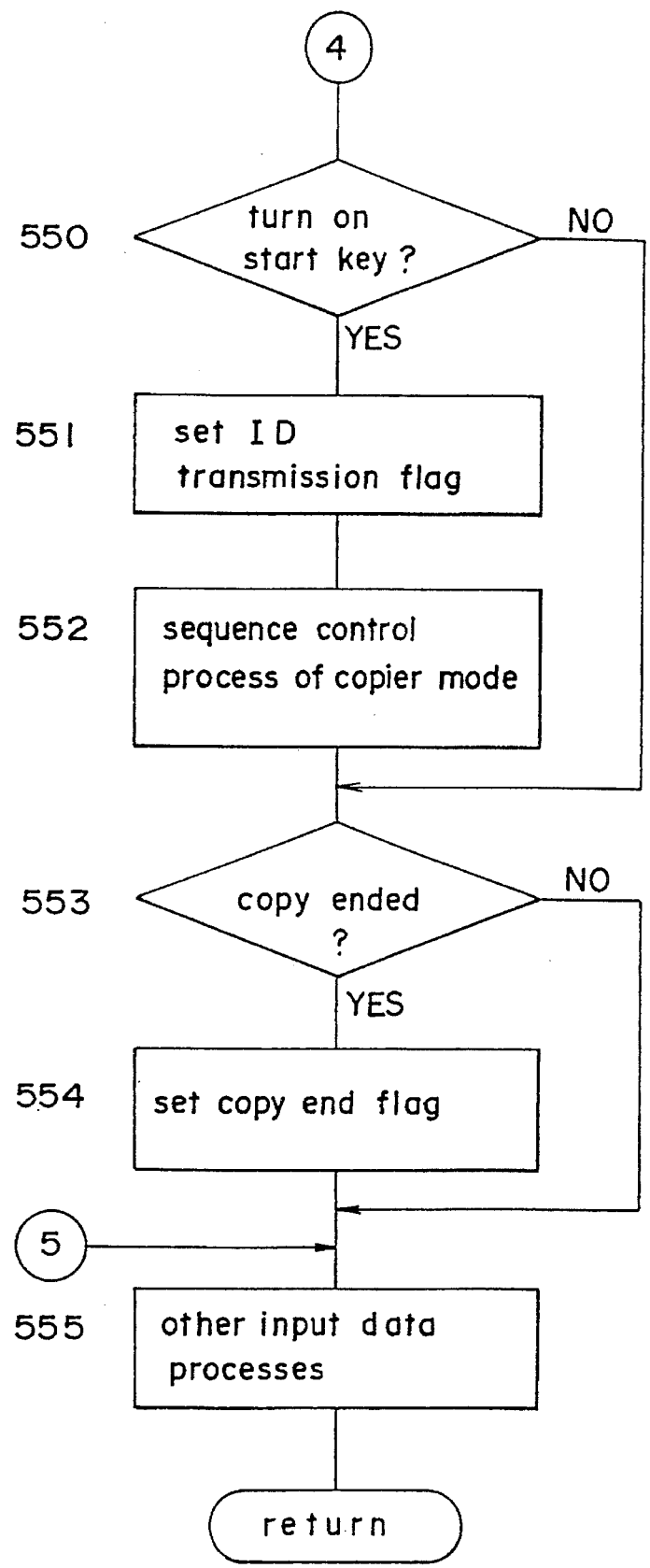
FIG. 22 is a flow chart showing the contents of the input data analysis process of FIG. 18.

As shown in FIG. 20, when the input data are memory erase data containing as their content the ID code and memory erase timing, the CPU 105 prepares to request that the memory erase information table IT be refreshed by the CPU 106. That is, the CPU 105 sets the record request flag indicating creation and transmission of communication data requesting the recording of the memory erase timing (#537, #538).

Thus, in the input data analysis process, the CPU 105 normally validates the input data relating to the memory erase information table IT. However, other input data are validated only when the copying apparatus 1 is in the operable state (state wherein the operable set flag is set) (#539).

The operation of the CPU 105 in the operable state is described hereinafter.

If input data are mode setting data indicating the user selected operation mode, the CPU 105 sets the mode setting flag in preparation for transmitting said data to other CPUs. (#540, #541).

The image forming mode in the copying apparatus 1 is broadly divided into the copier mode for reading original documents and printing stored image information in parallel processes, and printer mode (memory mode) for reading image information from the memory section 30 and printing said information without reading the original document. For example, when making multiple copies, printing of the first copy sheet is accomplished via the copier mode, and printing of the second and subsequent copy sheets is accomplished via the printer mode. The printer mode is set when called by the turning ON of the image verification button Z21, as described below.

When the printer mode is set, or when the input data are data posting the ON state of the image verification button Z21, the CPU 105 checks for the presence or absence of image information corresponding to the stored ID code (#542~#544).

If image information is stored in the code memory 306, the CPU 105 sets the printer mode and executes processing for displaying the image, as shown in FIG. 4 (#545, #546). The CPU 105 calls for data input to post the ON state of the execute button Z31, and executes the printer mode sequence control process (#547, #548).

Alternatively, when image information is not stored in the code memory 306, i.e., when memory erasure is executed, the CPU 105 executes processes for displaying specified messages indicating the printing in the printer mode is not possible (#549).

On the other hand, in the case wherein the printer mode is not set (#542), when the input data is a report indicating the ON state of the start key 96, the CPU 105 sets the ID transmission flag to transmit the ID code to the CPU 106, and executes the sequence control process of the copier mode (#550~#552). When the copy complete posting (signal generating source is CPU 108) is received, the CPU 105 sets the copy end flag in preparation for transmitting the posted report to each CPU (#553, #554).

Thereafter, the CPU 105 executes processing in accordance with other input data (#555), and returns to the main routine and executes the mode/command setting process of the next subroutine.

Mode/Command Setting Process and Output Data Transmission Process

Figure 23:
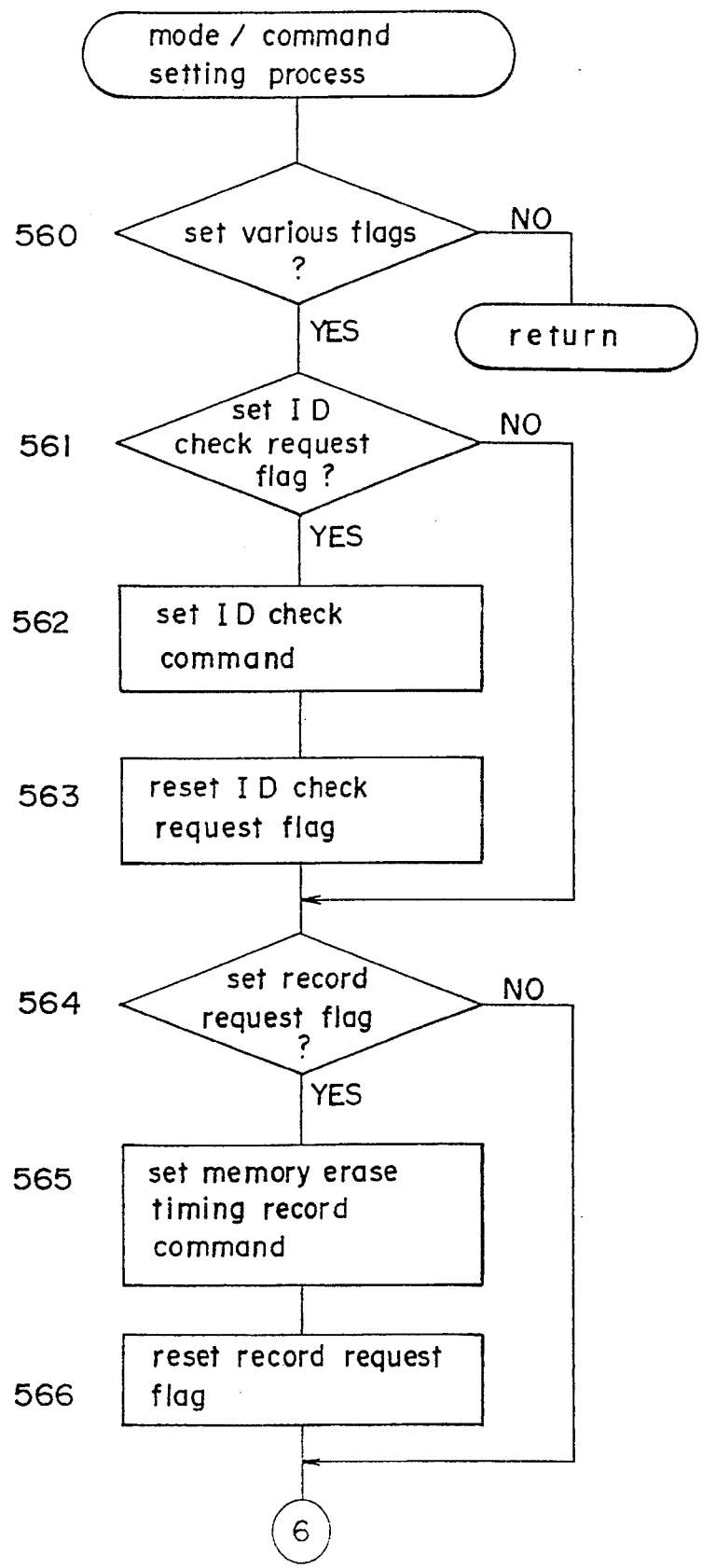
FIG. 23 is a flow chart showing the contents of the mode/command setting process of FIG. 18.
Figure 24:
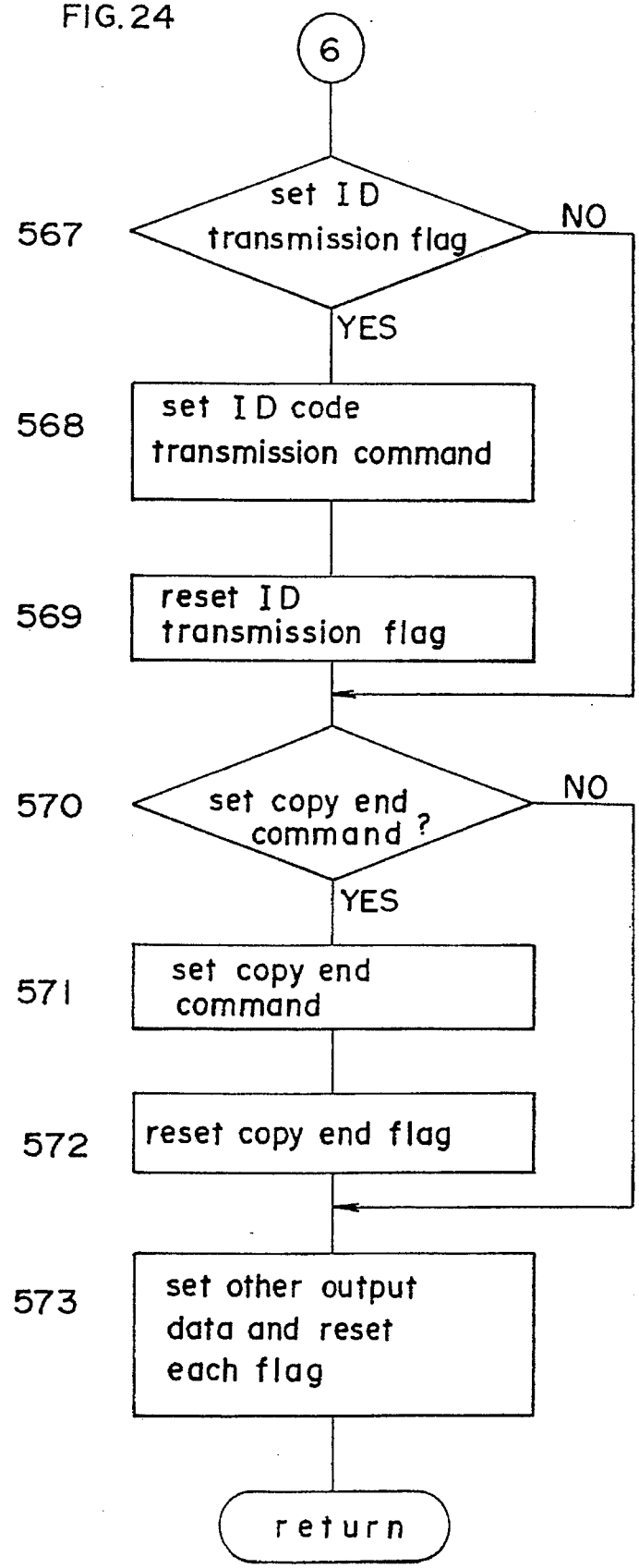
FIG. 24 is a flow chart showing the contents of the mode/command setting process of FIG. 18.

FIGS. 23 and 24 are flow charts showing the contents of the mode/command setting process (#54) of FIG. 18.

The CPU 105 sets the commands corresponding to the various flags of the set state in predetermined registers as output data, and reset each flag (#560~#573).

In this subroutine, the ID check command, memory erase timing record command, ID code transmit command, and copy end command are set as control data relative to the ID check request flag, record request flag, ID transmit flag, and copy end flag, respectively.

Figure 25:
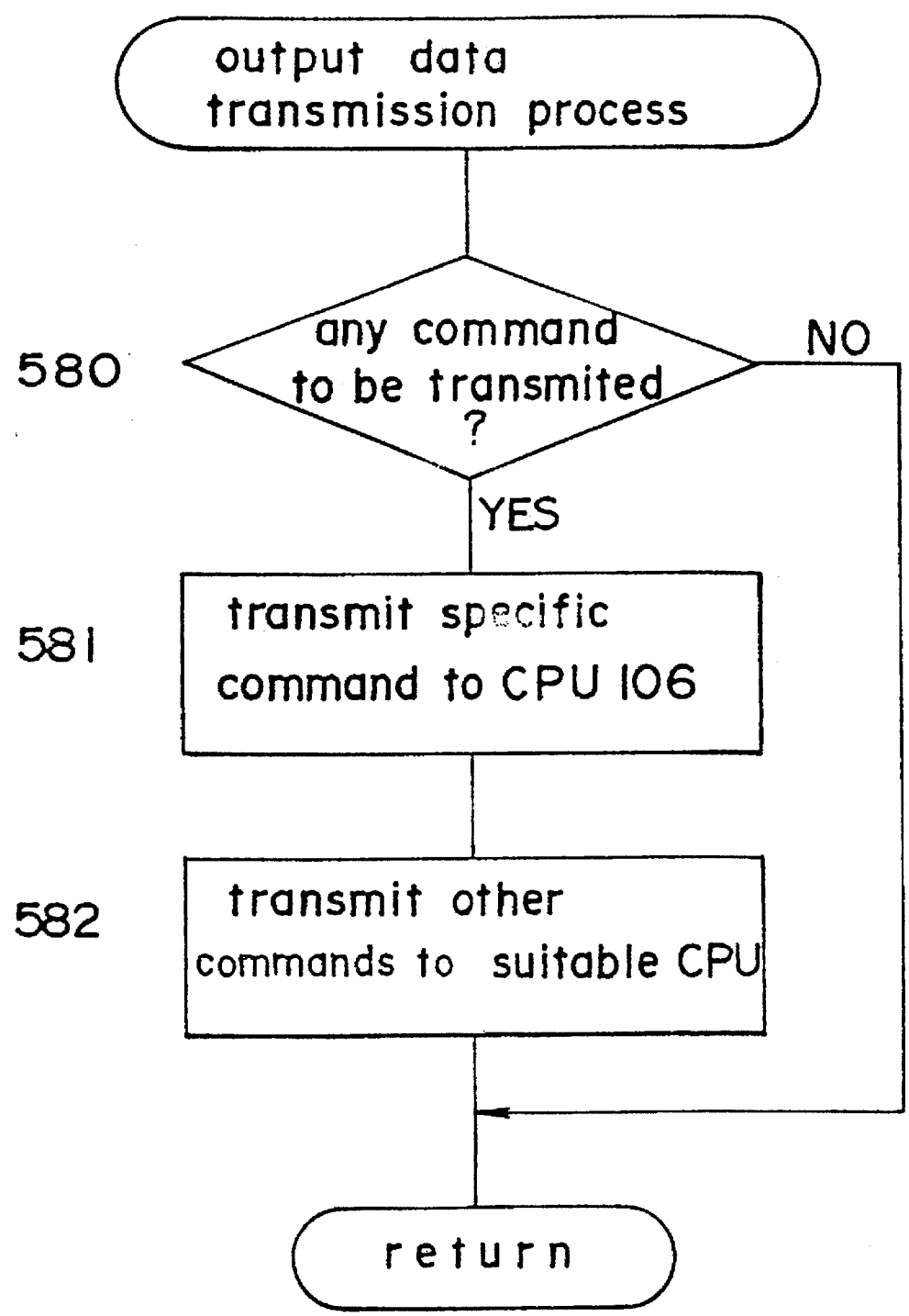
FIG. 25 is a flow chart showing the contents of the output data transmitting process of FIG. 18.

FIG. 25 is a flow chart showing the contents of the output data transmission process (#55) of FIG. 18.

In this subroutine, the CPU 105 transmits the aforesaid ID check command, memory erase timing record command, ID transmit command, and copy end command among the set commands as output data to the CPU 106, and transmits other commands to the appropriate CPUs (#580~#582).

CPU 106 Operation

Figure 26:
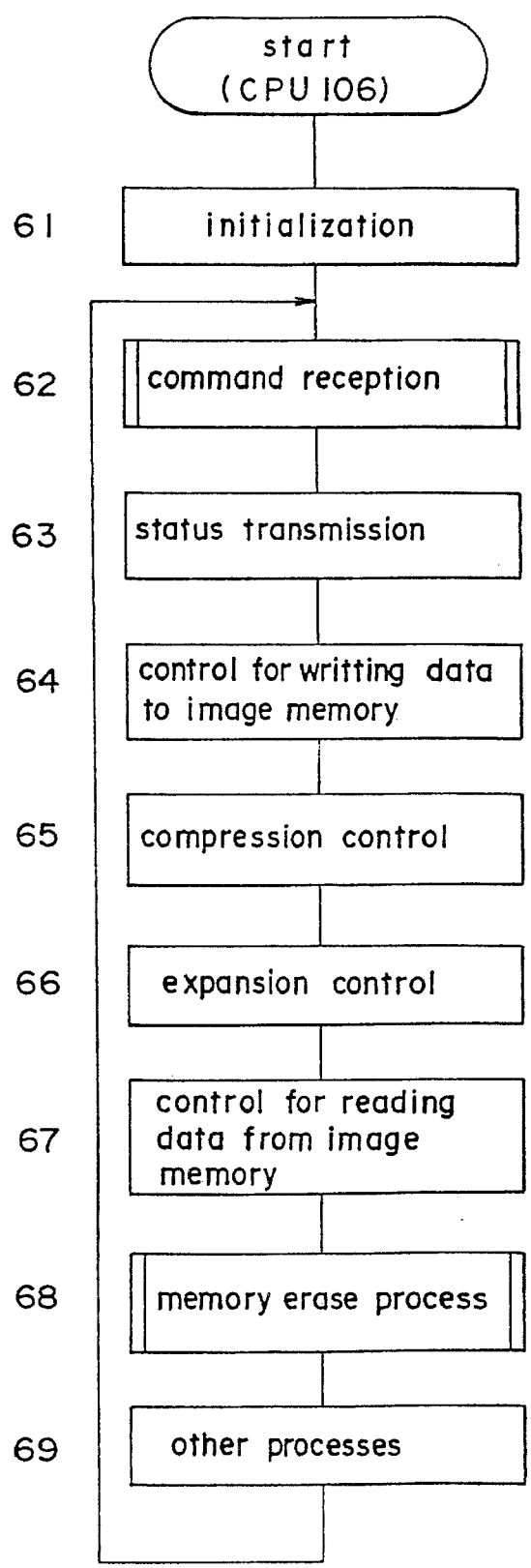
FIG. 26 is a flow chart showing the main routine of the CPU controlling the memory portion.

FIG. 26 is a flow chart of the main routine of the CPU 106 for controlling the memory section 30.

The CPU 106 receives commands from CPU 105 (#62), posts the status of the memory section 30 to the other CPUs (#63), controls the writing to the image memory 304 (#64), controls compression and expansion of data (#65, #66), controls readouts from the image memory 304 (#67), and controls memory erase (#68).

Command Reception Process

Figure 27:
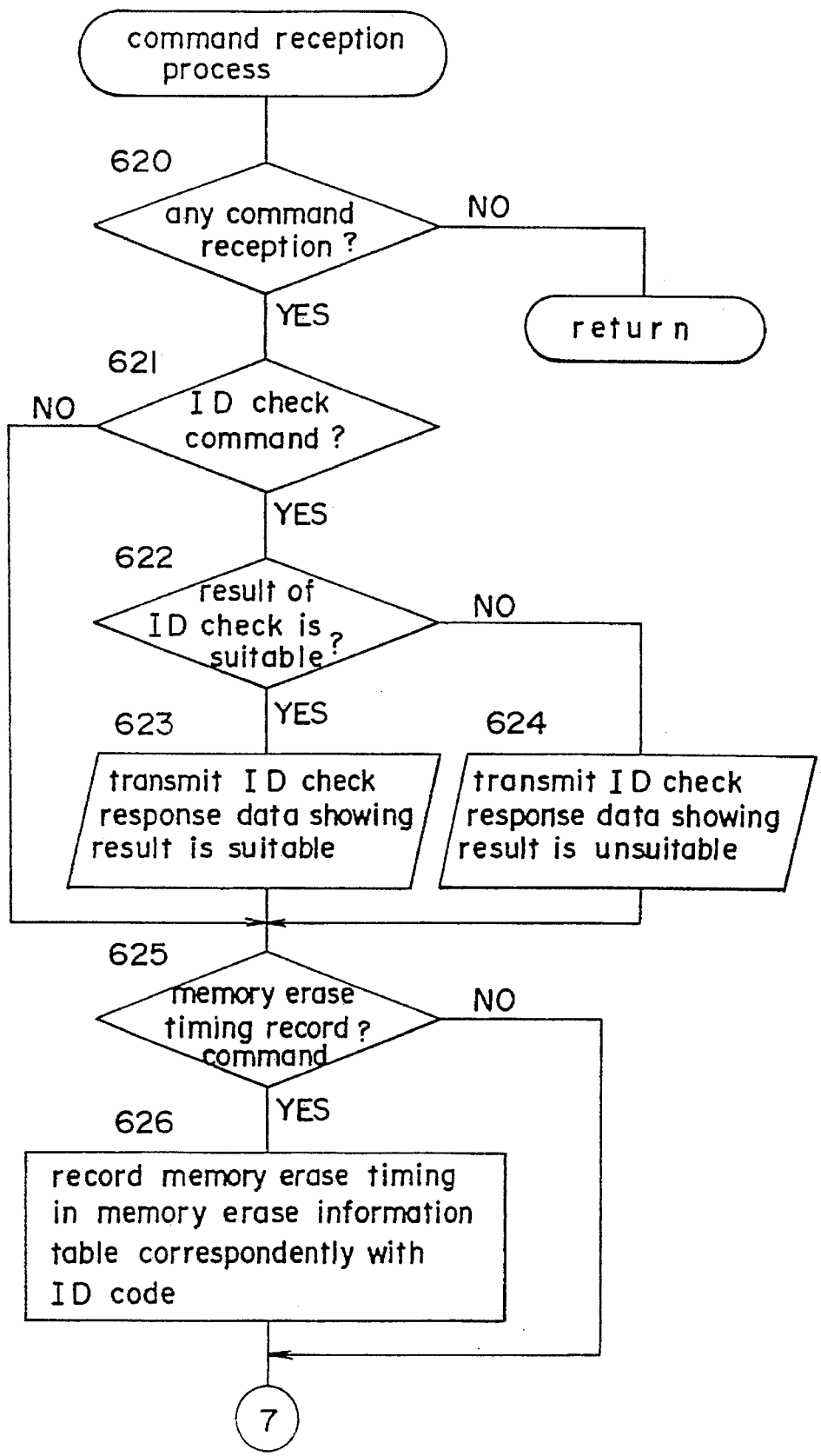
FIG. 27 is a flow chart showing the contents of the command reception process of FIG. 26.
Figure 28:
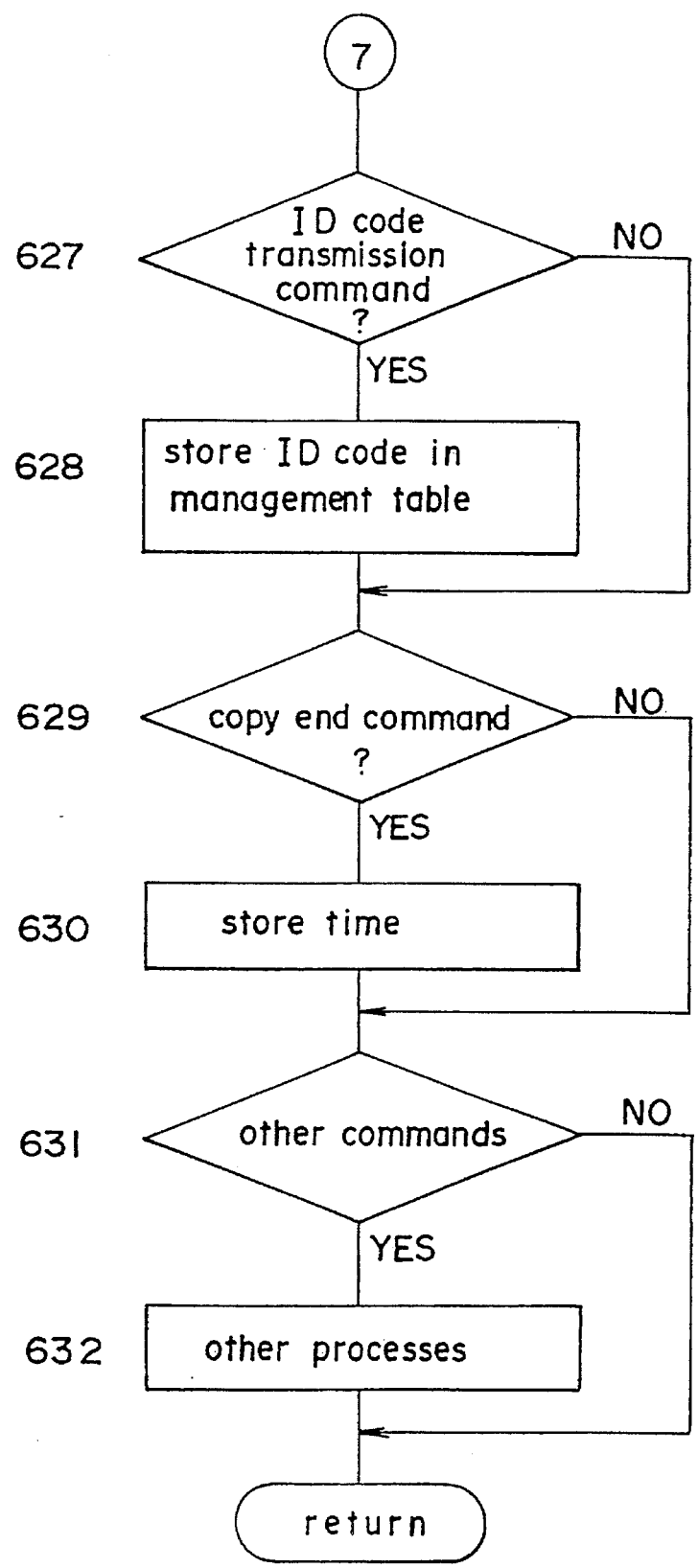
FIG. 28 is a flow chart showing the contents of the command reception process of FIG. 26.

FIGS. 27 and 28 are flow charts showing the contents of the command reception process (#62) of FIG. 26. In this subroutine, the CPU 106 executes specified processes in accordance with commands issued from the CPU 105 (#620~#632).

When an ID check command is received, the CPU 106 executes an ID check of the user input ID code, then executes an ID check response process in accordance with the results of said check (#621~#623). The ID check specifically is a process for discriminating the agreement/non-agreement of the user input ID code with the ID codes recorded in the memory erase information table IT.

When the memory erase timing record command is received, the CPU 106 records the memory erase timing in the memory erase information table IT (#625, #626) correspondently with the ID code.

When the ID code transmit command is received, the CPU 106 stores the ID code (i.e., ID code indicating the current user of the copying apparatus 1) as appended data in the RAM 126B management table MT1 (#627; #628).

When a copy end command is received, the CPU 106 saves the current time in memory (#629, #620). The saved time is a reference for the memory erase execution period.

Memory Erase Process

Figure 29:
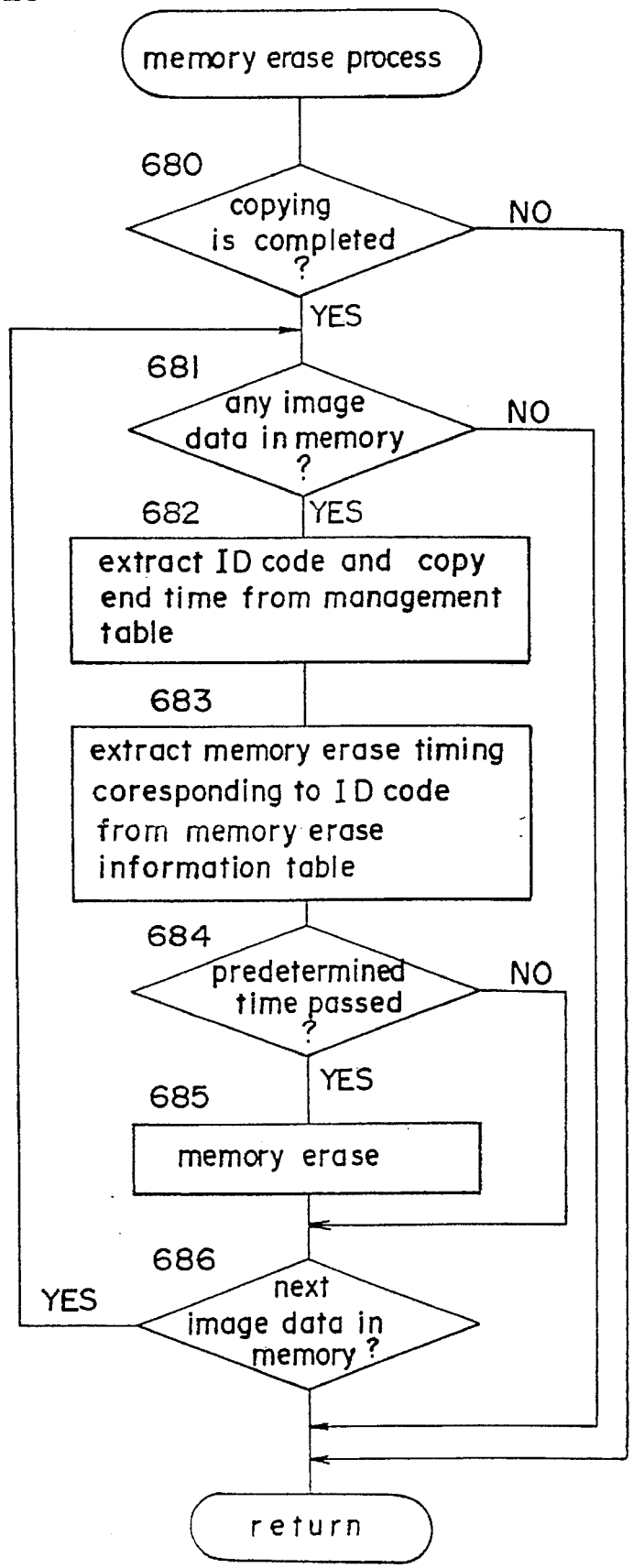
FIG. 29 is a flow chart showing the contents of the memory erase process of FIG. 26.

FIG. 29 is a flow chart showing the contents of the memory erase process of FIG. 26.

If image information is stored in the code memory 306 after copying is completed (i.e., when a printing operation is not on-going), the CPU 106 extracts the recorded ID code and copy end time corresponding to the image data from the management table MT1. Then, extracts the memory erase timing relating to the aforesaid ID code from the memory erase information table IT (#680~#683).

Then, the CPU 106 at the moment the memory erase timing has elapsed from the copy end time, specific memory areas in the code memory 306 are initialized in accordance with the management information of the management table MT1, such that one page or a plurality of pages of image information (one document) relating to the printing operation of a one-time printing are completely erased (#684, #685), The CPU 106 also refreshes (erases part of the management information) the management table MT1 simultaneously with the aforesaid initialization.

Thereafter, the CPU 106 repeatedly executes each of the aforesaid processes as long as image information remains in the code memory 306 (#686, #682). Thus, the image information is erased after the storage time expires (memory erase), and the code memory 306 is prepared to store new image information.

CPU 108 Operation

Figure 30:
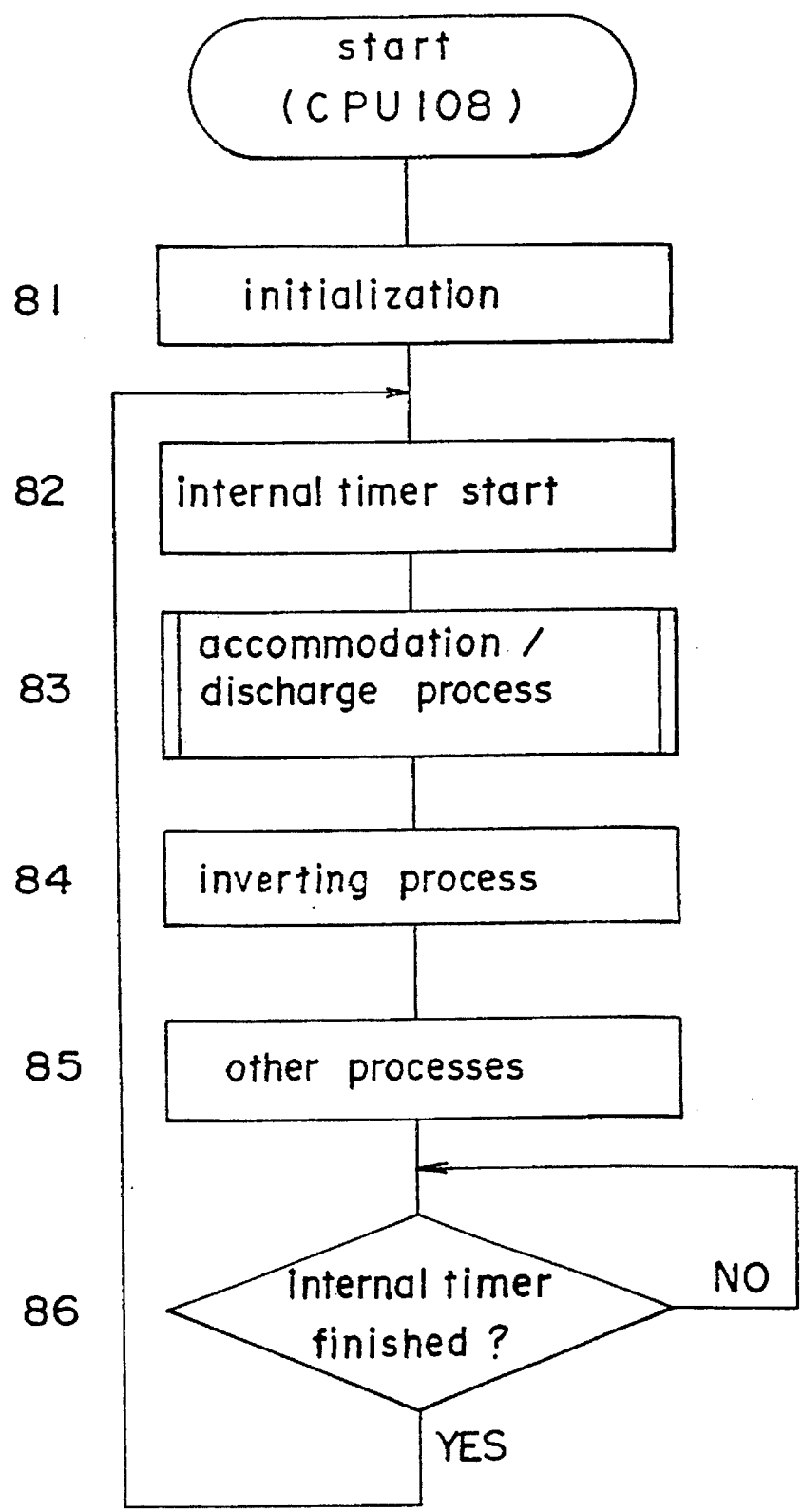
FIG. 30 is a flow chart showing the main routine of the CPU controlling the refeed paper device.

FIG. 30 is a flow chart of the main routine of the CPU 108 which controls the sheet recycling device 600.

The CPU 108 executes the paper accommodating and discharge processes for accommodating printed copy sheets discharged from the page printer PR and discharging said used sheets to the discharge tray 621 (#83). The CPU 108 also executes the inverting process for inverting the accommodated copy sheets (#84).

Accommodation/Discharge Process

Figure 31:
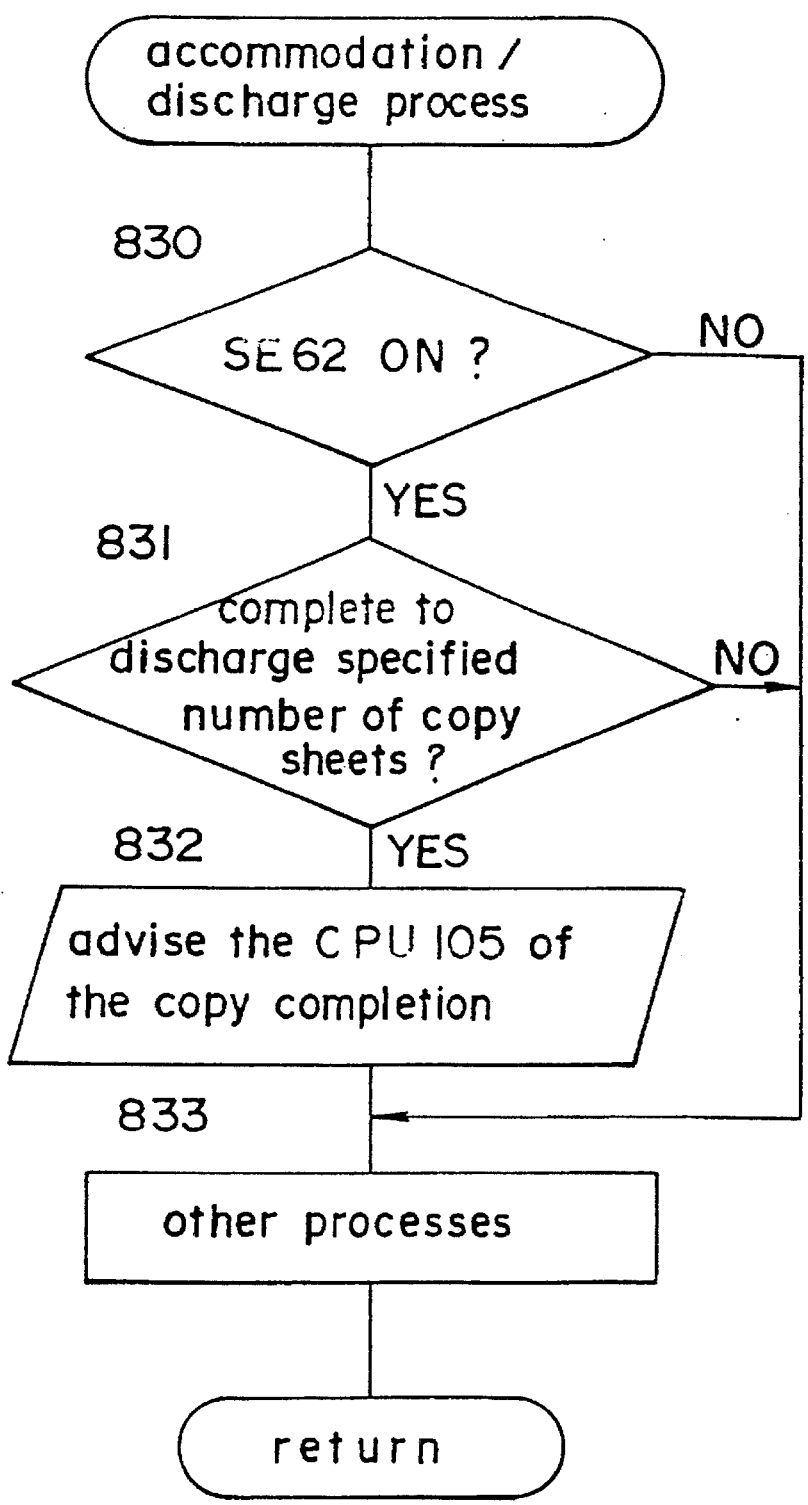
FIG. 31 is a flow chart showing the contents of the storing and discharge processes of FIG. 30.

FIG. 31 is a flow chart showing the contents of the accommodation/discharge process (#83) of FIG. 30.

The CPU 108 detects the discharge of printed copy sheets via a discharge sensor SE62 provided at the discharge aperture of the page printer unit PR, and advises the CPU 105 of the copy completion when a specified number of copy sheets have been discharged after the number of sheets corresponding to the number of original document has been printed (#830–#832).

The CPU 108 detects the status of each portion of the sheet recycling device 600 via sensors, and executes controls to switch the transport path, actuate feed rollers and execute other processes (#833).

Figure 32:
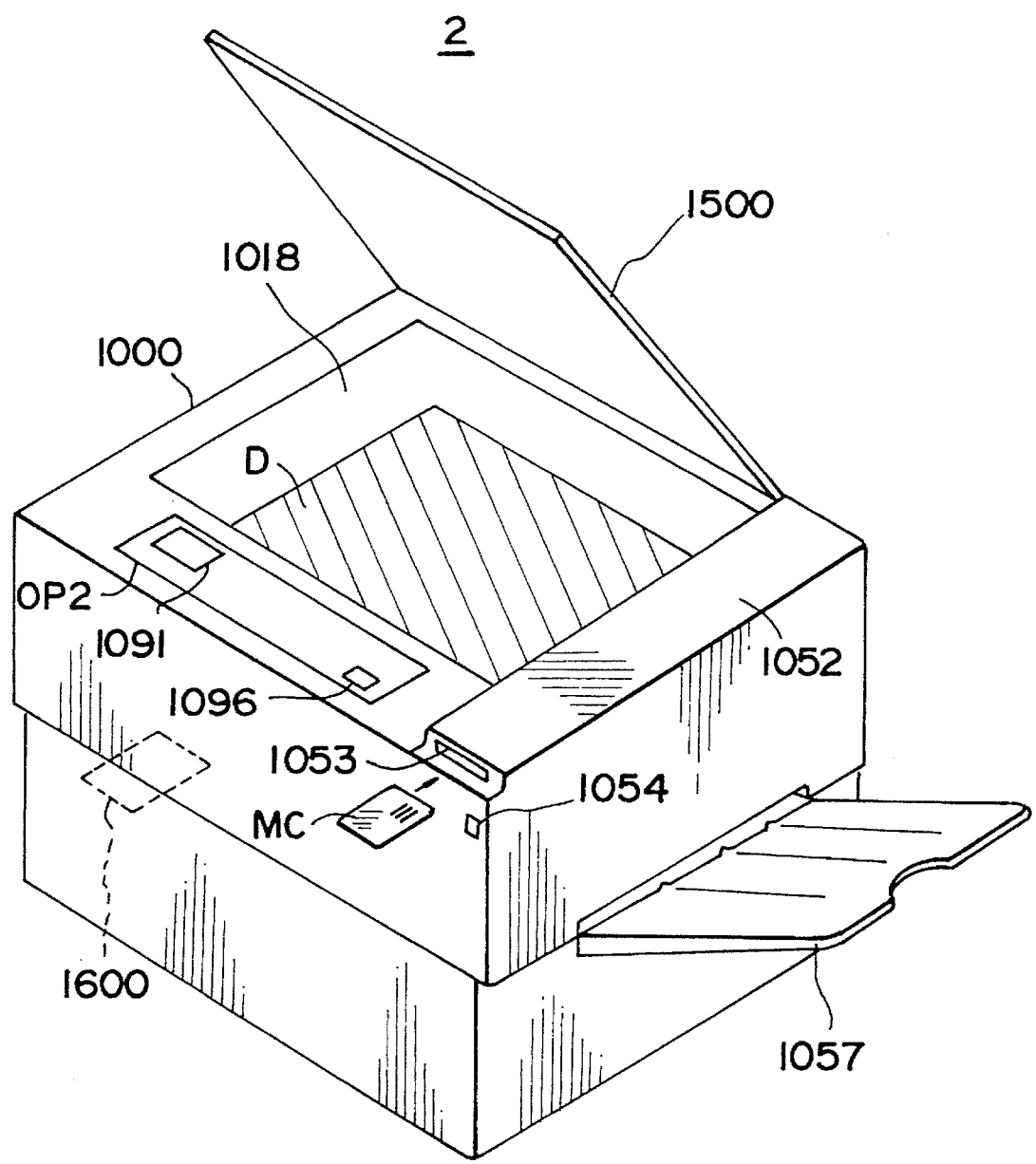
FIG. 32 is a perspective view showing the exterior of another embodiment of the copying apparatus of the present invention.

FIG. 32 is a perspective view showing the exterior of a copying apparatus 2 of another embodiment of the present invention.

The copying apparatus 2 comprises a main unit 1000 and a magnetic card MC for storing various information described below.

The main unit 1000 has a document platen 1018 and operation panel OP2 located at the top thereof, and further has a nonvolathe RAM 1600 provided with a memory erase information table IT (refer to FIG. 7). Arranged on the operation panel OP2 are liquid crystal touch panel 1091, and various key including a start key 1096.

Integratedly provided at the upper end of the main unit 1000 is a user management device 1052. The user management device 1052 is provided with a card insertion aperture 1053 adjacent to the operation panel OP2. When a user inserts a magnetic card MC into the card aperture 1053, the magnetic card MC is automatically loaded into the user management device 1052, and data are read and written to and from the magnetic card.

Normally, a plurality of magnetic cards MC are attached to the main unit 1000, and the magnetic cards MC are distributed in an office, for example, to each user or to departments to which the users belong, so as to manage the use of the copying apparatus 2 precisely.

Figure 33:
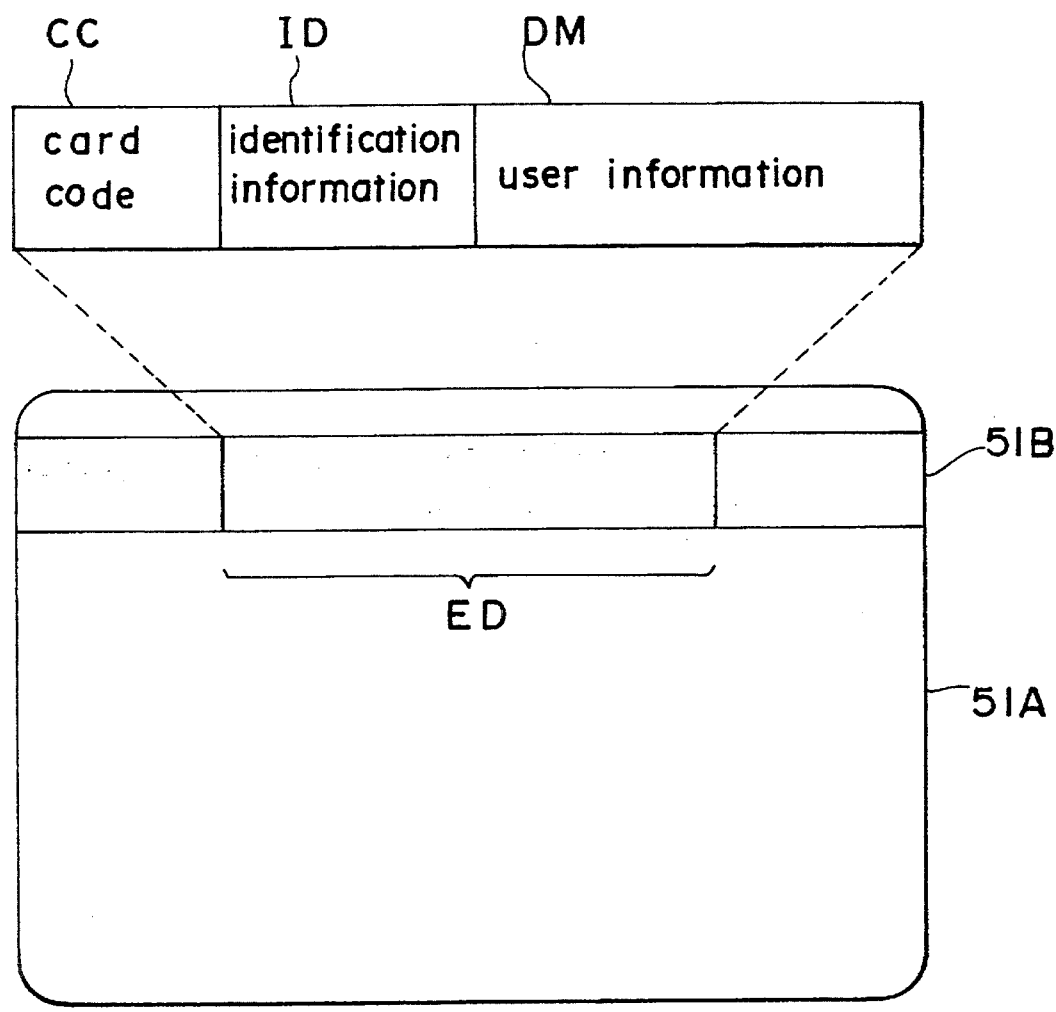
FIG. 33 is a top view showing the construction of the magnetic card.

FIG. 33 is a top view showing the construction of the magnetic card MC. The same drawing shows the alignment of the contents of the information stored in memory.

The magnetic card MC comprises a resin layer 51A superimposed on which is a band-like magnetic member 51B. The data area ED of the magnetic member 51B has recorded thereon card code CC for showing type of cards, identification information ID (hereinafter ID code) for identifying the user, number of cumulative printed sheets and other user information DM.

When the copying apparatus 2 of the aforesaid construction is used, the user sets the operable state of said copying apparatus 2 by inserting the magnetic card MC in the same manner as described for the first embodiment. That is, in the present case, the magnetic card MC functions as the key card.

When the magnetic card MC is set, the ID code is read, and stored in the control section (not illustrated) as information specifying the user. An ID input operation is not necessary each time the copying apparatus 2 is used.

Then, the user places an original document D on the document platen 1018, and covers the original document D with the document cover 1500, thereafter, the user turns ON the operation key (not illustrated) on the operation panel OP2 to set the desired printing conditions.

When a user turns ON the start key 1096, image information storing and printing is accomplished in parallel operation with the reading of the original document, and the printed copy sheet is discharged to the discharge tray 1057. After printing is completed, the user depresses the card discharge key 1054 provided at the bottom of the card aperture 1053. Thus, the magnetic card MC can be moved from within the user management device 1052 to the card aperture 1053.

Thereafter, the image information is erased when the memory maintaining period recorded in the memory erase information table IT has elapsed.

During the memory maintaining period, hardcopy images corresponding to the original D can be obtained quickly by user printing in the print mode (memory mode copy).

According to the above embodiments, the recording of the memory erase timing can be freely changed, such that a user can optimize the use of the apparatus in accordance with changing circumstances.

According to the embodiment of FIG. 32, the speed of the copy operation is improved because the ID code input operation is not required each time the apparatus is used.

Although, in the previously described embodiments, the memory erase is a standard time set as the moment a uniform time elapsed from copy completion to erase the memory, it is to be understood that the execution of memory erasure may be generated at a time of occurrence of a specific condition or situation relating to the use of the copying apparatus. For example, the memory erasure time may be set at the stage of completing a copy operation wherein a user may open the document cover or remove the document from the document platen 18 or the like, or at the stage of starting a new copy operation wherein a user sets a document or closes the document cover, the user uses an operation key such as the ten-key pad or start key or the like, the copy apparatus detects the original document size or detects manually fed sheets. Furthermore, the memory erasure also may be executed when paper empty state is detected, the user removes the paper cassette, a jam is detected, a user opens the front cover to access a paper jam or the like.

In the aforesaid embodiment, the ID code has been described as a secret number of one to four digits, but is to be noted that-the number of digits may be uniform. Users may also be identified by a personal characteristic such as fingerprint, voiceprint, or blood oxygen concentration.

Although a copying apparatus was illustrated in the previously described embodiments, it is understood that the present invention may be adapted to facsimile apparatus, printers and other image forming apparatus.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus comprising:

read means for reading an image of a document;

memory means for storing an image information read by said read means;

image forming means for forming an image on a sheet of paper according to the image information stored in said memory means;

erasing means for erasing the image information stored in said memory means when the operation of said image forming means is terminated;

judging means for judging whether an operator of the apparatus is a specific user or not; and inhibit means for inhibiting the operation of said erasing means for a predetermined time period when said judging means judges that the operator is the specific user.

2. An image forming apparatus as defined in claim 1, wherein said judging means includes:

second memory means for storing codes of users;

setting means for setting the code of said specific user in said second memory means;

detecting means for detecting the operator; and comparing means for comparing the code stored in said second memory means and the detected code by said detecting means.

3. An image forming apparatus as defined in claim 2, wherein said detecting means includes input means for manually inputting the code of the operator.

* * * * *